United States Patent
Qiu et al.

(10) Patent No.: US 8,370,045 B2
(45) Date of Patent: Feb. 5, 2013

(54) STARTER CONTROL VALVE FAILURE PREDICTION MACHINE TO PREDICT AND TREND STARTER CONTROL VALVE FAILURES IN GAS TURBINE ENGINES USING A STARTER CONTROL VALVE HEALTH PROGNOSTIC, PROGRAM PRODUCT AND RELATED METHODS

(75) Inventors: Hai Qiu, Clifton Park, NY (US); Naresh Sundaram Iyer, Clifton Park, NY (US); Weizhong Yan, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 713 days.

(21) Appl. No.: 12/541,811

(22) Filed: Aug. 14, 2009

(65) Prior Publication Data
US 2011/0040470 A1 Feb. 17, 2011

(51) Int. Cl.
*G06F 19/00* (2006.01)
(52) U.S. Cl. ............... 701/100; 415/13; 415/19; 60/786; 60/792
(58) Field of Classification Search ................... 701/100; 415/13, 19; 60/786, 792
See application file for complete search history.

(56) References Cited

U.S. PATENT DOCUMENTS

| | | | |
|---|---|---|---|
| 5,033,010 A | 7/1991 | Lawrence et al. | |
| 5,095,694 A | 3/1992 | Shekleton et al. | |
| 5,463,865 A | 11/1995 | Smith | |
| 5,748,500 A | 5/1998 | Quentin et al. | |
| 6,456,928 B1 | 9/2002 | Johnson | |
| 6,470,258 B1 | 10/2002 | Leamy et al. | |
| 6,498,978 B2 | 12/2002 | Leamy et al. | |
| 6,845,306 B2 | 1/2005 | Henry et al. | |
| 6,868,325 B2 * | 3/2005 | Menon et al. | 701/100 |
| 6,941,217 B1 * | 9/2005 | Munson, Jr. | 701/100 |
| 7,043,348 B2 | 5/2006 | Uluyol et al. | |
| 7,072,797 B2 | 7/2006 | Gorinevsky | |
| 7,216,489 B2 | 5/2007 | Uluyol et al. | |
| 7,251,550 B2 | 7/2007 | Eschborn et al. | |
| 7,337,086 B2 | 2/2008 | Guralnik et al. | |
| 7,346,469 B2 | 3/2008 | Taware et al. | |
| 7,369,932 B2 | 5/2008 | Kim et al. | |
| 7,506,517 B2 * | 3/2009 | Uluyol et al. | 60/786 |
| 2001/0020360 A1 * | 9/2001 | Tsukamoto et al. | 60/39.53 |
| 2006/0195248 A1 * | 8/2006 | Kim et al. | 701/100 |
| 2007/0234734 A1 | 10/2007 | Uluyol et al. | |

OTHER PUBLICATIONS

Diagram of Starter Control Valve, MIL-V-8199516(AS), 1 page, Published circa 1995.

* cited by examiner

*Primary Examiner* — Mark Hellner
(74) *Attorney, Agent, or Firm* — Bracewell & Giuliani LLP

(57) ABSTRACT

Starter control valve failure prediction machines, systems, program products, and computer implemented methods to predict and trend starter control valve failures in gas turbine engines using a starter control valve health prognostic and to make predictions of starter control valve failures, are provided. A computer implemented method according to an embodiment of the present invention can include the steps of generating a continuous starter control valve deterioration trend function responsive to a plurality of health indices derived from gas turbine engine startup data downloaded from gas turbine engine sensors for a plurality of startups and analyzing the continuous starter control valve deterioration trend function to identify potential starter control valve failure points where the points on the starter control valve deterioration trend function correlate to a starter control valve health prognostic responsive to historic gas turbine engine startup data downloaded from gas turbine engine sensors.

20 Claims, 14 Drawing Sheets

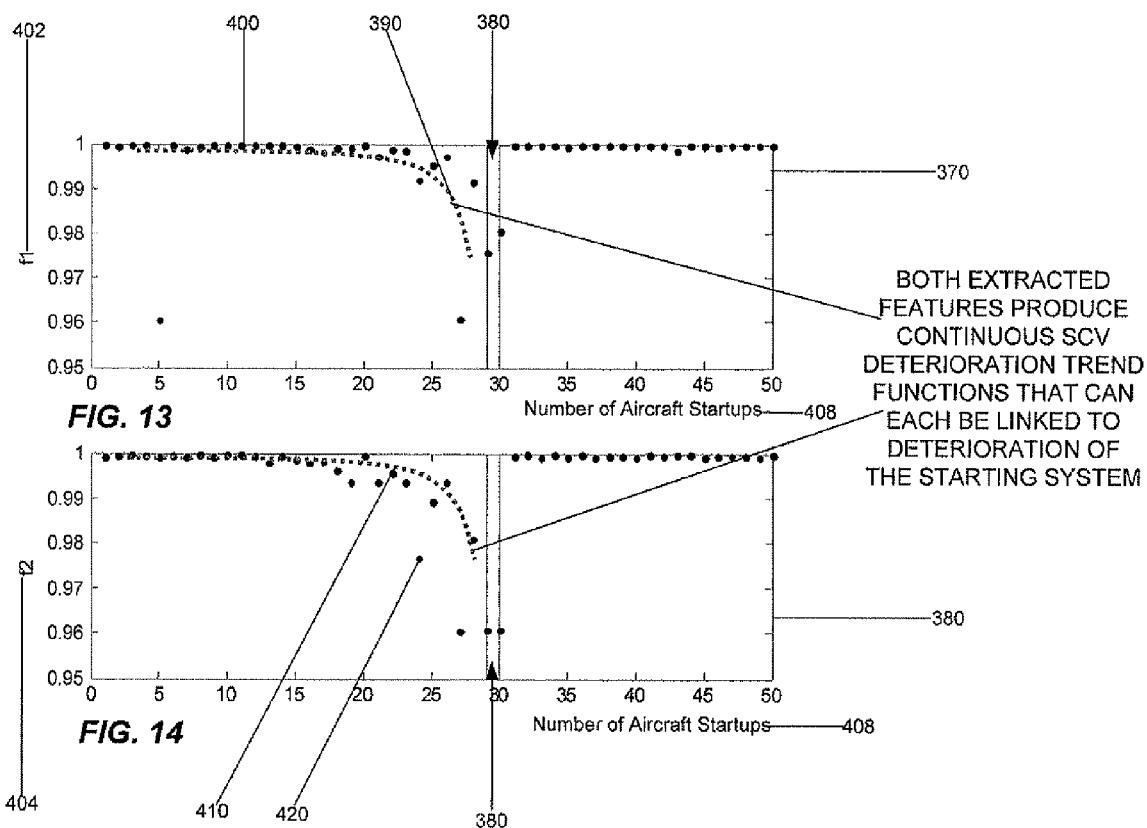

STARTER CONTROL VALVE FAILURE PREDICTION MACHINE TO PREDICT AND TREND STARTER CONTROL VALVE FAILURES IN GAS TURBINE ENGINES USING A STARTER CONTROL VALVE HEALTH PROGNOSTIC, PROGRAM PRODUCT AND RELATED METHODS

BACKGROUND OF THE INVENTION

1. Field of the Invention

The present invention relates generally to the field of gas turbine engine maintenance. More specifically, the present invention relates to the field of predicting and trending the failure of the starter control valves of gas turbine engines.

2. Description of Related Art

Gas turbine engine starter control valves are used to regulate the initial mechanical energy needed for accelerating a gas turbine engine to an initial speed before fuel ignition occurs in the gas turbine engine which creates and imparts additional thermal energy for bringing the engine to the desired speed for take-off as the starter control valve is controlled by the pilot of the aircraft using electronic control signals, such as a starter button. A failure in the starter control valve subsystem can result in the pilot's inability to regulate the pre-start process of the gas turbine engine thereby preventing the engine from reaching an initial speed that the engine must obtain before fuel ignition occurs in the gas turbine engine. The inability of an engine to reach the speed required for fuel ignition prevents the engine from starting and can therefore result in a flight or mission cancellation, especially if the engine is required to be operational for take-off.

Although a starter control valve failure often manifests itself as a failed gas turbine engine start attempt followed shortly by a successful gas turbine engine start, in some instances, a starter control valve failure prevents the gas turbine engine from being started and can accordingly result in the cancellation of a flight. A starter control valve failure can even result in a mission cancellation. Presently, operational crews log failed start attempts, and such logs are analyzed to provide a repair recommendation or action. However, no system, method, or computer program product exists to proactively detect a starter control valve failure prior to its occurrence. Thus, under present systems, the replacement of a starter control valve occurs only after a complete starter control valve failure resulting in the inability of a pilot to start an engine, or after multiple failed start attempts have been observed. The inability to proactively detect starter control valve failures can result in the allocation of ill-prepared aircraft to critical missions thereby producing increased costs due to mission aborts and aircraft reallocation. Additionally, the unscheduled occurrence of starter control valve failures can also result in reactive, rather than proactive, maintenance practices and related practices and processes on supply-chain and aircraft inventory management that can ultimately lead to increased costs and increased aircraft unavailability and downtime.

Systems and methods to detect a starter control valve failure are known, however, such systems and methods are incapable of accurately predicting the point of failure of a starter control valve prior to the event of failure. Other systems and methods are known that proactively predict the possibility of an aircraft component failure, however, these systems and methods fail to identify how to predict the failure point of a starter control valve prior to an event of failure. Still other systems and methods, at least to some extent, trend and predict the failure of gas turbine engine components by analyzing currently gathered aircraft performance data against historical data and past trends within the historical data. Such systems and methods, however, require detailed knowledge of an aircraft component in its "as new" state in order to trend the failure of that component.

Although such a system and method can function at least to some extent for newer aircraft components for which a fall "as new" operational data history is known, older legacy components, including starter control valves, can lack such a sufficient historic data record thereby resulting in inaccurate predictions of failure when this method is applied to try to proactively determine starter control component failure prior to an actual event of failure. Therefore, the inventors have recognized that the ability to predicitvely detect starter control valve failures can be directly related to the minimization of operational costs due to aircraft mission aborts, aircraft cancellations, and aircraft mission aborts.

The inventors, therefore, have recognized the need for machines, systems, computer program products, and related computer implemented methods to proactively predict and trend starter control valve failures in gas turbine engines using a starter control valve health prognostic. Although rudimentary systems and methods which can, to some extent, predict and trend engine component failure are known, none employ a starter control valve health prognostic responsive to historic performance data, (as opposed to hypothetical "as new" performance data), to precisely identify the point of failure for a starter control valve prior to the component's actual failure. Additionally, the inventors have recognized the need for machines, systems, computer program products, and related computer implemented methods to identify a projected point of failure for a starter control valve by constructing a continuous starter control valve deterioration trend function responsive to current operational data so that a precise failure point can be identified far in advance of an actual event of failure. Although prior systems and methods employ trend functions to aid in the prediction of a point of failure for an engine component, such systems and methods analyze past trends in general historic aircraft engine startup data rather than trending presently collected engine startup data to construct a continuous starter control valve deterioration trend that can be compared to a starter control valve health prognostic to determine fixture points of failure for starter control valves.

SUMMARY OF THE INVENTION

In view of the foregoing, various embodiments of the present invention beneficially provide machines, systems, computer program products, and related computer implemented methods to predict starter control valve failures in gas turbine engines using a starter control valve health prognostic. Various embodiments of the present invention provide machines, systems, computer program products, and related computer implemented methods that can predict the failure of a starter control valve by analyzing historic gas turbine engine startup data downloaded from sensors of a certain gas turbine engine model to generate a starter control valve health prognostic, and comparing the starter control valve failure signature to health indices calculated from startup data collected for one or more startups of a gas turbine engine of the certain gas turbine engine model, to identify potential predictive starter control valve failure points at points where the health index for a particular startup correlates to the starter control valve health prognostic. Additionally, various embodiments of the present invention, for example, provide machines, systems, computer program products, and related computer implemented methods that can make a long-range prediction of a starter control valve point of failure by generating a continuous starter control valve deterioration trend function responsive to a plurality of health indices derived from gas turbine engine startup data downloaded from sensors of a gas turbine engine of a certain gas turbine engine model for a plurality of gas turbine engine startups, and analyzing the continuous starter control valve deterioration trend function to identify potential predictive starter control valve failure points where the points on the starter control valve deterioration trend function correlate to a starter control valve health prognostic.

Moreover, various embodiments of the present invention apply gas turbine engine data to minimize or otherwise reduce false positive indications of starter control valve failure. Specifically, in the case of a gas turbine engine associated with an aircraft, various embodiments of the present invention can identify other aircraft errors to thereby reduce false positive indications of starter control valve failures. For example, an embodiment of the present invention can determine the existence of one or more mechanical problems associated with the auxiliary power unit, the compressor, the air turbine, the ignition system, the fuel system, or the lube pressure system of an aircraft, and can determine the existence of pilot initiated purging of the fuel injection system of a gas turbine engine. Responsive to determining the existence, or likelihood, of such additional gas turbine engine data, such an embodiment of the present invention can, for example, display, via a graphical user interface device of the computer, the potential predictive starter control valve failure point, the existence of one or more mechanical problems, and the existence of pilot initiated purging of the gas turbine engine. Such an embodiment of the present invention can then receive input from a user via a user interface input device indicating whether the potential predictive starter control valve failure point is a false positive indication of a starter control valve failure.

Various embodiments of the present invention provide can provide numerous benefits, including but not limited to the following: (1) they can proactively predict and trend starter control valve failures in gas turbine engines prior to an actual event of failure using a starter control valve health prognostic; (2) they can identify a remote projected point of failure for a starter control valve by constructing a continuous starter control valve deterioration trend function responsive to current operational data that can be tracked as the actual event of failure approaches; (3) they can reduce operational costs for aircraft operators due to better allocation of aircraft to critical missions, reduced aircraft cancellations, reduced aircraft downtime, and reduced safety-related accidents; (4) they can increase aircraft safety; and (5) they can reduce false positive indications of a starter control valve failure by applying data specific to the gas turbine engine model. Beneficially, various embodiments of the present invention can predict a starter control valve failure by identifying a potential predictive starter control valve failure point or by constructing a continuous starter control valve deterioration trend function responsive to a plurality of starter control valve health indices to identify a precise failure point far in advance of an actual event of failure. Because various embodiments of the present invention can be used in real time data analysis to locate a potential predictive starter control valve failure point as it occurs or to identify a precise failure point far in advance of an actual event of failure, various embodiments of the present invention can be immediately and beneficially applied to legacy vehicles that use gas turbine engines, such as aircraft, on the verge of experiencing a starter control valve failure. Beneficially, the present invention is not limited in applicability to new vehicles, new aircraft, or legacy gas turbine engines with new starter control valves.

BRIEF DESCRIPTION OF THE DRAWINGS

So that the manner in which the features and benefits of various embodiments of the invention, as well as others which will become apparent, can be understood in more detail, a more particular description of the various embodiments of the invention can be had by reference to the embodiments thereof which are illustrated in the appended drawings, which form a part of this specification. It is also to be noted, however, that the drawings illustrate only various embodiments of the invention and are therefore not to be considered limiting of the invention's scope as it can include other effective embodiments as well.

FIG. 13 is a two-dimensional line graph, plotting both a plurality of health indices of an aircraft, one for each startup period, and a continuous starter control valve deterioration trend function responsive to the plurality of health indices of the aircraft according to an embodiment of the present invention.

FIG. 14 is a two-dimensional line graph, plotting both a plurality of health indices of an aircraft, one for each startup period, and a continuous starter control valve deterioration trend function responsive to the plurality of health indices of the aircraft according to an embodiment of the present invention.

DETAILED DESCRIPTION

Figure 1:
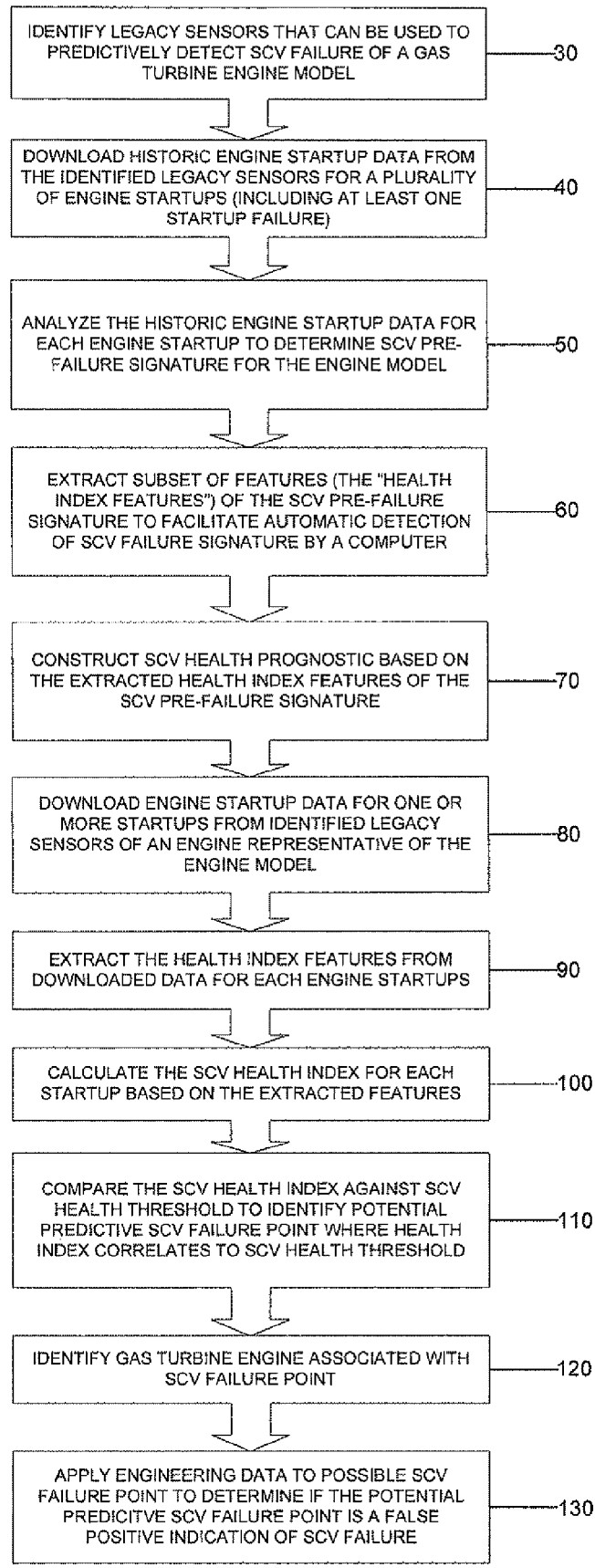
FIG. 1 is a schematic block flow diagram of various computer implemented methods to predict starter control valve failures in gas turbine engines using a starter control valve health prognostic according to an embodiment of the present invention.

The present invention will now be described more fully hereinafter with reference to the accompanying drawings which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follows, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Various embodiments of the present invention beneficially provide machines, systems, computer program products, and related computer implemented methods to predict and trend starter control valve failures in gas turbine engines using a starter control valve health prognostic. Various embodiments of the present invention also provide machines, systems, computer program products, and related computer implemented methods to predict the failure of a starter control valve by analyzing historic gas turbine engine startup data downloaded from sensors of a gas turbine engine of a certain gas turbine engine model to generate a starter control valve health prognostic and comparing the starter control valve health prognostic to health indices calculated from startup data collected for one or more startups of one or more gas turbine engines of the certain gas turbine engine model to thereby identify potential predictive starter control valve failure points where the health index for a particular startup correlates to the starter control valve health prognostic. According to various embodiments of the present invention, the one or more sensors can beneficially include, for example, legacy sensors. Additionally, various embodiments of the present invention, for example, provide machines, systems, computer program products, and related computer implemented methods to make one or more long-range predictions of a starter control valve point of failure by generating a continuous starter control valve deterioration trend function responsive to a plurality of health indices derived from gas turbine engine startup data downloaded from sensors of a gas turbine engine of a certain gas turbine engine model for a plurality of gas turbine engine startups and by analyzing the continuous starter control valve deterioration trend function to identify potential predictive starter control valve failure points where the points on the starter control valve deterioration trend function correlate to a starter control valve health prognostic responsive to historic gas turbine engine startup data downloaded from sensors of an gas turbine engine of the certain gas turbine engine model. As used throughout, the term correlate or correlates includes relationships, associations, linear correlations, non-linear correlations, and any other systematic connection or relationship with respect to data. Moreover, various embodiments of the present invention apply gas turbine engine data to reduce false positive indications of starter control valve failure.

According to various embodiments of the present invention, a gas turbine engine can be associated with a vehicle, including, an aircraft, an automobile, a train, a boat, or any other means of conveyance, carriage, or transport powered by one or more gas turbine engines as is known and understood by those skilled in the art. Moreover, a gas turbine engine model can be representative of a group of gas turbine engines all of the same make, model, specification, type, or genre and does not necessarily indicate that all gas turbine engines of a certain gas turbine engine model are associated with the same vehicle. Rather gas turbine engines of a certain gas turbine engine model can be, for example, associated with several different vehicles of different types. Specifically, a gas turbine engine of a certain gas turbine engine model can be used, for example, in association with an airplane or a boat. So that the systems, methods, and computer implemented methods according to various embodiments of the present invention can be described in sufficient detail, the systems, methods, and computer implemented methods according to various embodiments of the present invention are described below in association with an aircraft, a particular type of vehicle, by way of example only.

A computer implemented method to predict starter control valve failures in gas turbine engines can include, for example, the steps of determining a starter control valve pre-failure signature for a gas turbine engine model, constructing a starter control valve health prognostic responsive to the starter control valve pre-failure signature for a gas turbine engine model, calculating a starter control valve health index for each of one or more engine startups of a gas turbine engine of the gas turbine engine model, comparing each of the one or more health indices with the starter control valve health prognostic for the gas turbine engine model to identify a potential predictive starter control valve failure where one of the one or more health indices correlates to the starter control valve health prognostic for the gas turbine engine model, identifying the gas turbine engine associated with the potential predictive starter control valve failure, and applying data specific to the gas turbine engine model to determine if the potential predictive starter control valve failure is a false positive indication of a starter control valve failure. Accordingly, various embodiments of the present invention can ultimately provide an accurate prediction of the precise failure point of a starter control valve in a gas turbine engine.

As is perhaps best illustrated in FIG. 1, a computer implemented method to predict starter control valve failures in gas turbine engines using a starter control valve health prognostic according to an embodiment of the present invention can include the steps of identifying one or more sensors, which can beneficially include, for example, legacy sensors, of a gas turbine engine model usable to predict failure of a starter control valve of an engine of the gas turbine engine model prior to an event of failure (block 30), downloading onto a computer historic gas turbine engine startup data (block 40), storing the historic gas turbine engine startup data in a first database stored on a computer readable storage medium of the of the computer, and analyzing the historic gas turbine engine startup data stored in the first database for each of the plurality of engine startups to determine a starter control valve pre-failure signature for the gas turbine engine model (block 50). Furthermore, such a method according to an embodiment of the present invention can include the steps of extracting via the computer health index features of the starter control valve pre-failure signature for the gas turbine engine model to facilitate detection of a starter control valve pre-failure point by the computer (block 60), storing the health index features in a second database stored in the computer readable storage medium of the computer, constructing a starter control valve health prognostic for the gas turbine engine model responsive to the health index features stored in the second database (block 70), and storing the starter control valve health prognostic for the gas turbine engine model in a third database stored in the computer readable storage medium of the computer.

The term, historic gas turbine engine startup data, refers to gas turbine engine startup data usable to predict failure of a starter control valve of an engine of a gas turbine engine model prior to an event of failure. Historic gas turbine engine startup data can include, for example, gas turbine engine startup data that is downloaded for a plurality of engine startups from one or more sensors, which can beneficially include, for example, legacy sensors, of a gas turbine engine of a gas turbine engine model where one of the plurality of engine startups failed due to a starter control valve failure. The one or more sensors can include, but are not limited to, an auxiliary power, a plurality of engine start switch sensors, one for each engine of the aircraft, and a plurality of gas turbine engine RPM sensors, one for each engine of the aircraft. More specifically, the start switch sensors can, for example, record the start switch state for the engine associated with the start switch. The start switch state can include, but is not limited to, start, run, motor, and stop. Additionally, according to an embodiment of the present invention, health index features can be a subset of features of a starter control valve pre-failure signature for a gas turbine engine model that facilitates automatic detection of a starter control valve pre-failure signature by a computer.

A starter control valve health prognostic, according to various embodiments of the present invention, can be a single value, a plurality of values, a rate of declination, or any other quantity, figure, range, set, or formula usable to proactively predict failure of starter control valves. In exemplary cases, a health prognostic threshold can be defined in instances where the starter control valve health prognostic includes a plurality of values or is a range, set, or formula. Accordingly, machines, systems, computer readable program products, and computer implemented methods according to various embodiments of the present invention, in such cases, can determine whether a health index falls within the health prognostic threshold to thereby identify a potential predictive starter control valve failure point where one of the one or more health indices correlates to a value within the starter control valve health prognostic for a certain gas turbine engine model. Also according to various embodiments of the present invention, a starter control valve health prognostic can be, for example, a rate of declination. In such cases, machines, systems, computer readable program products, and computer implemented methods according to various embodiments of the present invention can determine, for example, a health index rate of declination for the one or more starter control valve heath indices, and determine whether the health index rate of declination is greater or equal to the starter control valve health prognostic to thereby identify a potential predictive starter control valve failure point where the health index rate of declination is greater or equal to the starter control valve health prognostic.

A computer implemented method to predict starter control valve failures in gas turbine engines using a starter control valve health prognostic can also include the steps of downloading onto the computer gas turbine engine startup data from the gas turbine engine or another gas turbine engine representative of the gas turbine engine model for one or more engine startups of one or more engines of the gas turbine engine model (block 80), storing the gas turbine engine startup data in the first database, extracting via the computer the health index features for each of the one or more engine startups of each of the one or more engines from the gas turbine engine startup data stored in the first database (block 90), calculating via the computer a starter control valve health index for each of the one or more engine startups responsive to the health index features for each of the one or more engine startups (block 100), and storing the one or more starter control valve health indices in a fourth database stored in the computer readable storage medium of the computer. Moreover, such a computer implemented method can further include the steps of comparing each of the one or more health indices with the starter control valve health prognostic for the gas turbine engine model to identify a potential predictive starter control valve failure where one of the one or more health indices correlates to the starter control valve health prognostic for the gas turbine engine model (block 110), identifying the gas turbine engine associated with the potential predictive starter control valve failure (block 120), and applying data specific to the gas turbine engine model to determine if the potential predictive starter control valve failure is a false positive indication of a starter control valve failure (block 130). The step of comparing each of the one or more health indices with the starter control valve health prognostic (block 110) and the step of identifying the particular gas turbine engine associated with the potential predictive starter control valve failure point (block 120) can be, for example, performed via the computer.

As is also perhaps best illustrated by FIG. 1, a computer implemented method according to an embodiment of the present invention can beneficially include, for example, the step of receiving gas turbine engine startup data for a plurality of gas turbine engine startups of one or more gas turbine engines of a certain gas turbine engine model and associated with a first vehicle where one of the plurality of engine startups failed due to a starter control valve failure to thereby define historic gas turbine engine startup data (block 40). The computer implemented method can additionally include the steps of determining, in a first computer process by a first computer, at least one starter control valve pre-failure signature for at least one of the one or more gas turbine engines associated with the first vehicle responsive to the historic gas turbine engine startup data (block 50), and constructing, in a second computer process by the first computer, a starter control valve health prognostic for the certain gas turbine engine model (block 70) responsive to one or more health index features extracted from the at least one starter control valve pre-failure signature of the at least one of the one or more gas turbine engines associated with the first vehicle and determined by the first computer process (block 60). Furthermore, the computer implemented method described above can also include the steps of receiving gas turbine engine startup data for at least one gas turbine engine startup of one or more gas turbine engines of the certain gas turbine engine model and associated with a second vehicle (block 80), and calculating, in a third computer process by a second computer, a starter control valve health index for each of the at least one engine startups (block 100) responsive to health index features extracted from the gas turbine engine startup data (block 90).

Advantageously, according to various embodiments of the present invention, the computer implemented method can also include the steps of comparing, in a fourth computer process by the second computer, each of the one or more health indices calculated by the third computer process with the starter control valve health prognostic for the certain gas turbine engine model to identify a potential predictive starter control valve failure point of the second vehicle where one of the one or more health indices correlates to the starter control valve health prognostic for the certain gas turbine engine model (block 110), and identifying, in a fifth computer process by the second computer, the gas turbine engine of the second vehicle associated with the potential predictive starter control valve failure point identified by the fourth computer process (block 120). The first vehicle and the second vehicle, according to various embodiments of the present invention, can be the same vehicle, and the first computer and the second computer, according to various embodiments of the present invention, can be the same computer.

According to an embodiment of the present invention, the health index features extracted from the starter control valve pre-failure signature for the gas turbine engine model can include, but are not limited to, the engine start switch state and the time it takes a gas generator of a gas turbine engine to reach a preselected gas generator speed as measured from a preselected gas generator benchmark speed such as the start state speed of the gas generator. The preselected gas generator speed of the gas turbine engine can be, for example, the post-light-off gas generator speed, one-half of the post-light-off gas generator speed, the gas generator speed required for an engine start, one-half of the gas generator speed required for an engine start, or any other pre-selected percentage of the gas generator speed required for a gas turbine engine start. In cases where the gas turbine engine has more than one engine, the extracted health index features can further include the entropy of the time it takes each gas generator associated with each of the one or more engines to reach a preselected gas generator speed as measured from a preselected gas generator benchmark speed such as the start state speed of the gas generator. More specifically, the step of calculating a starter control valve health index for each of the one or more engine startups responsive to the health index features for each of the one or more gas turbine engine startups 72 can be, for example, calculated using the following equation:

$$HealthIndex = -\sum_{i=1}^{n} p_i \cdot \log_2(p_i),$$

where $$p_i = \frac{t_i}{\sum t_i},$$

where n=the number of engines of a vehicle. In the foregoing health index equation, the time it takes the gas generator of the ith engine to reach post-light-off RPM is the health index feature that the health index is derived from. Accordingly, in the foregoing health index equation, $t_i$ represents the time for the gas generator of the ith engine to reach post-light-off RPM as measured from a preselected bench mark speed of each of the one or more gas generators.

The starter control valve pre-failure signature and the starter control valve health prognostic can, for example, be expressed as a sequence of alpha-numeric characters and can be readable by a computer. The starter control valve pre-failure signature and the starter control valve health prognostic can also be expressed graphically in a from such as a pictorial representation of the signature, a line graph of the signature, a bar graph of the signature, a two-dimensional plot graph of the signature, or a three-dimensional plot graph of the signature. Additionally, according to an embodiment of the present invention, the health indices can, for example, be expressed in the same form as the starter control valve pre-failure signature and the starter control valve health prognostic. Beneficially, depending on the form in which the starter control valve starter control valve health prognostic is expressed, the health indices can be, for example, correlated numerically, alpha-numerically, or graphically to the starter control valve health prognostic. Additionally, the term download refers to any transfer of data, including both sending and receiving of data, between one data storage unit and a different data storage including, but not limited to, connections via direct cable, wireless, infrared, Bluetooth, WI-FI, telecommunications network, communications network, or the Internet.

Also according to an embodiment of the present invention, the gas turbine engine associated with the potential predictive starter control valve failure point can be identified by applying an engine identity algorithm in cases where a vehicle has more than two engines. Consider, for example, an exemplary case where an aircraft has four gas turbine engines. In such cases, the engine identity algorithm can receive as input, for example, the RPM sensor readings for four gas turbine engines. As a first step, the engine identity algorithm can determine the lowest and highest RPM sensor readings of the four gas turbine engines. If the lowest and highest RPM sensor readings are not equal, the algorithm can then calculate the average difference between the two median RPM sensor readings to the lowest RPM sensor reading (d1) and to the highest RPM sensor reading (d2), respectively. If d1 is greater than d2, the gas turbine engine associated with the potential predictive starter control valve failure point is the engine with the highest RPM. If d1 is less than d2, then the gas turbine engine associated with the potential predictive starter control valve failure point engine is the engine with the lowest RPM. Accordingly, after this process, the gas turbine engine associated with a potential predictive starter control valve failure point can be accurately determined according to an embodiment of the present invention.

According to an embodiment of the present invention, for example, a more generalized version of the engine identity algorithm can be applied in cases where a vehicle has three or more engines. Particularly, the engine identity algorithm can receive as input, for example, gas turbine engine startup data, such as RPM sensor readings, for each of three or more gas turbine engines. As a first step, the generalized engine identity algorithm can determine the lowest and highest RPM sensor readings for each of the three or more gas turbine engines. If the lowest and highest RPM sensor readings are not equal, the algorithm can then calculate the average difference between the two median RPM sensor readings to the lowest RPM sensor reading (d1) and to the highest RPM sensor reading (d2), respectively. If d1 is greater than d2, the gas turbine engine associated with the potential predictive starter control valve failure point is the engine with the highest RPM. If d1 is less than d2, then the gas turbine engine associated with the potential predictive starter control valve failure point is the engine with the lowest RPM. Accordingly, after this process, the gas turbine engine associated with a potential predictive starter control valve failure point can be accurately determined according to an embodiment of the present invention.

In exemplary cases where a vehicle has exactly two gas turbine engines, gas turbine engine startup data, including, for example, RPM sensor data, can be directly analyzed and compared to historic gas turbine engine startup data to determine the gas turbine engine associated with the potential predictive starter control valve failure point. As is perhaps obvious, in cases where a vehicle has only a single gas turbine engine, the gas turbine engine associated with a potential predictive starter control valve failure point must certainly be that particular, single engine of the vehicle. Accordingly, in cases where a vehicle has only a single engine, there is no need to apply the engine identity algorithm.

Figure 2:
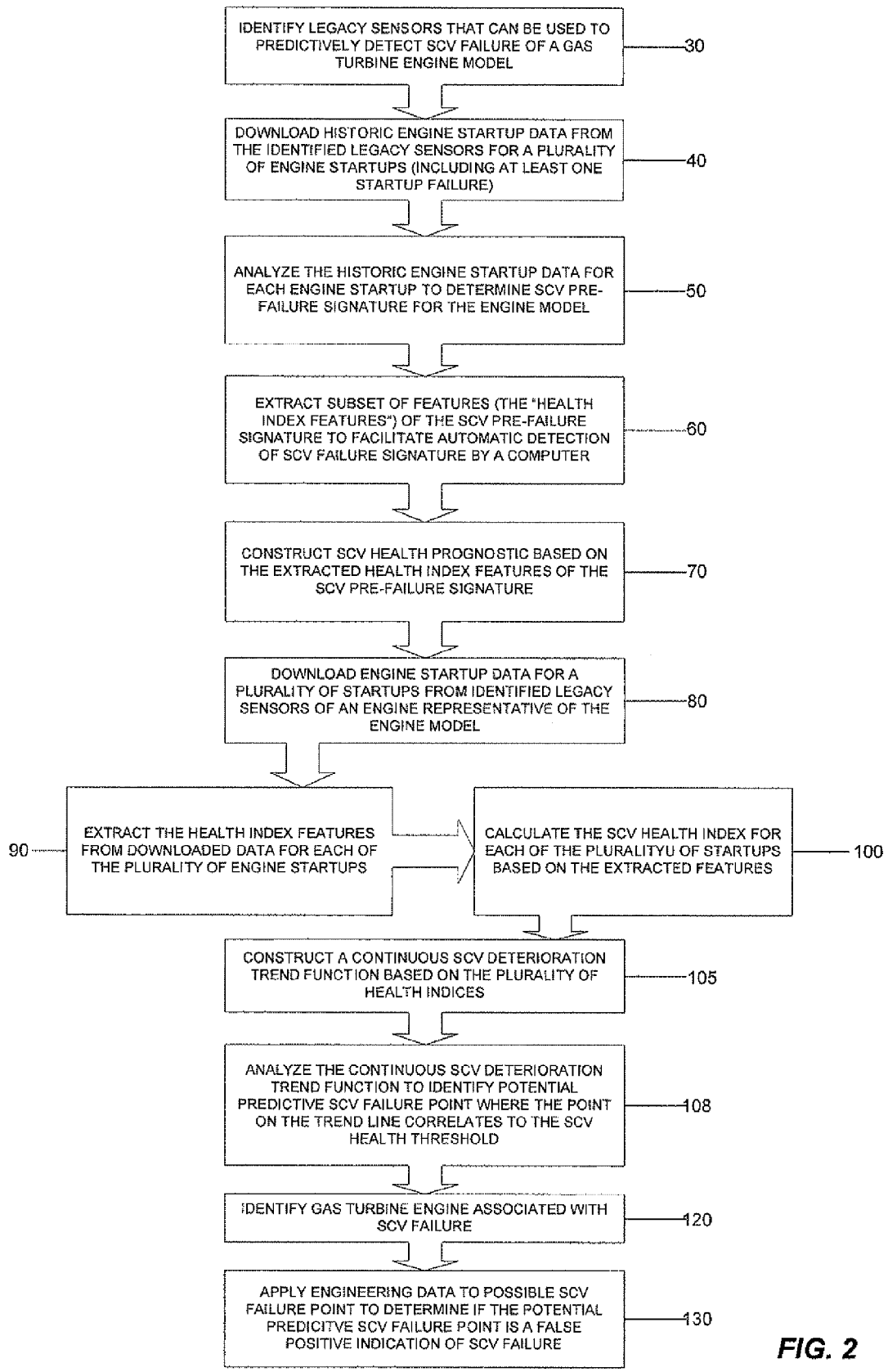
FIG. 2 is a schematic block flow diagram of various computer implemented methods to predict starter control valve failures in gas turbine engines using a continuous starter control valve deterioration trend function according to an embodiment of the present invention.

As perhaps best illustrated in FIG. 2, an embodiment of the present invention can also include a computer implemented method to predict and trend starter control valve failures in gas turbine engines using a starter control valve health prognostic and a continuous starter control valve deterioration trend function. A computer implemented method to predict and trend starter control valves in gas turbine engines can include, for example, the steps of identifying one or more sensors of an gas turbine engine model usable to predict failure of a starter control valve of an engine of the gas turbine engine model prior to an event of failure (block 30), downloading onto a computer gas turbine engine startup data from the identified one or more sensors for a plurality of engine startups of a vehicle of the gas turbine engine model where one of the plurality of engine startups failed due to a starter control valve failure to thereby define historic gas turbine engine startup data (block 40), and storing the historic gas turbine engine startup data in a database stored on a computer readable storage medium of the computer. According to various embodiments of the present invention, the one or more sensors can beneficially include, for example, legacy sensors. After the step of downloading the historic gas turbine engine startup data (block 40), the computer implemented method according to an embodiment of the present invention can additionally include, for example, the steps of analyzing the historic gas turbine engine startup data stored in the database for each of the plurality of engine startups to determine a starter control valve pre-failure signature for the gas turbine engine model (block 50), extracting via the computer a subset of features of the starter control valve pre-failure signature for the gas turbine engine model to facilitate automatic detection of the starter control valve pre-failure signature by the computer to thereby define health index features (block 60), and storing the health index features in the database. Beneficially, the health index features stored in the database can be, for example, used to construct a starter control valve health prognostic for the gas turbine engine model responsive to the health index features stored in the database (block 70), and this starter control valve health prognostic for the gas turbine engine model can also be stored in the database.

According to an embodiment of the present invention, the computer implemented method can also include the steps to download current operational gas turbine engine startup data from a gas turbine engine of the gas turbine engine model or a vehicle associated with a gas turbine engine of the gas turbine engine model (block 80). More specifically, in the case of an aircraft, the computer implemented method can include, for example, the steps of downloading onto the computer gas turbine engine startup data from the identified one or more sensors of an aircraft representative of the gas turbine engine model for a plurality of engine startups (lock 80) and storing the downloaded gas turbine engine startup data in the database. Moreover, the computer implemented method can include steps to extract health index features for each of the plurality of engine startups from the gas turbine engine startup data stored in the database (block 90). The computer implemented method can also include, for example, the steps of calculating via the computer a starter control valve health index for each of the plurality of engine startups responsive to the health index features for each of the plurality of engine startups (block 100) and storing the plurality of starter control valve health indices in the database. Beneficially, the plurality of starter control valve health indices can be manipulated and transformed to construct via the computer a continuous starter control valve deterioration trend function responsive to the plurality of starter control valve health indices that can be, for example, stored in the database (block 105). The computer implemented method according to an embodiment of the present invention can further include the steps of analyzing the continuous starter control valve deterioration trend function to identify a potential predictive starter control valve failure point where a point on the starter control valve deterioration trend function correlates to the starter control valve health prognostic for the gas turbine engine model stored in the database (block 108) and identifying via the computer the gas turbine engine associated with the potential predictive starter control valve failure point (block 120). Lastly, the computer implemented method can, for example, include the step of applying data specific to the gas turbine engine model to determine if the potential predictive starter control valve failure point is a false positive indication of a starter control valve failure (block 130).

Additionally, the step of analyzing the continuous starter control valve deterioration trend function to identify a potential predictive starter control valve failure point where a point on the starter control valve deterioration trend function correlates to the starter control valve health prognostic for the gas turbine engine model stored in the database (block 108) can further include the steps of displaying via a graphical user interface of the computer the continuous starter control valve deterioration trend function and receiving input via a user interface input device of the computer from a user identifying a potential predictive starter control valve failure point where a point on the starter control valve deterioration trend function correlates to the starter control valve health prognostic for the gas turbine engine model stored in the database.

Figure 3:
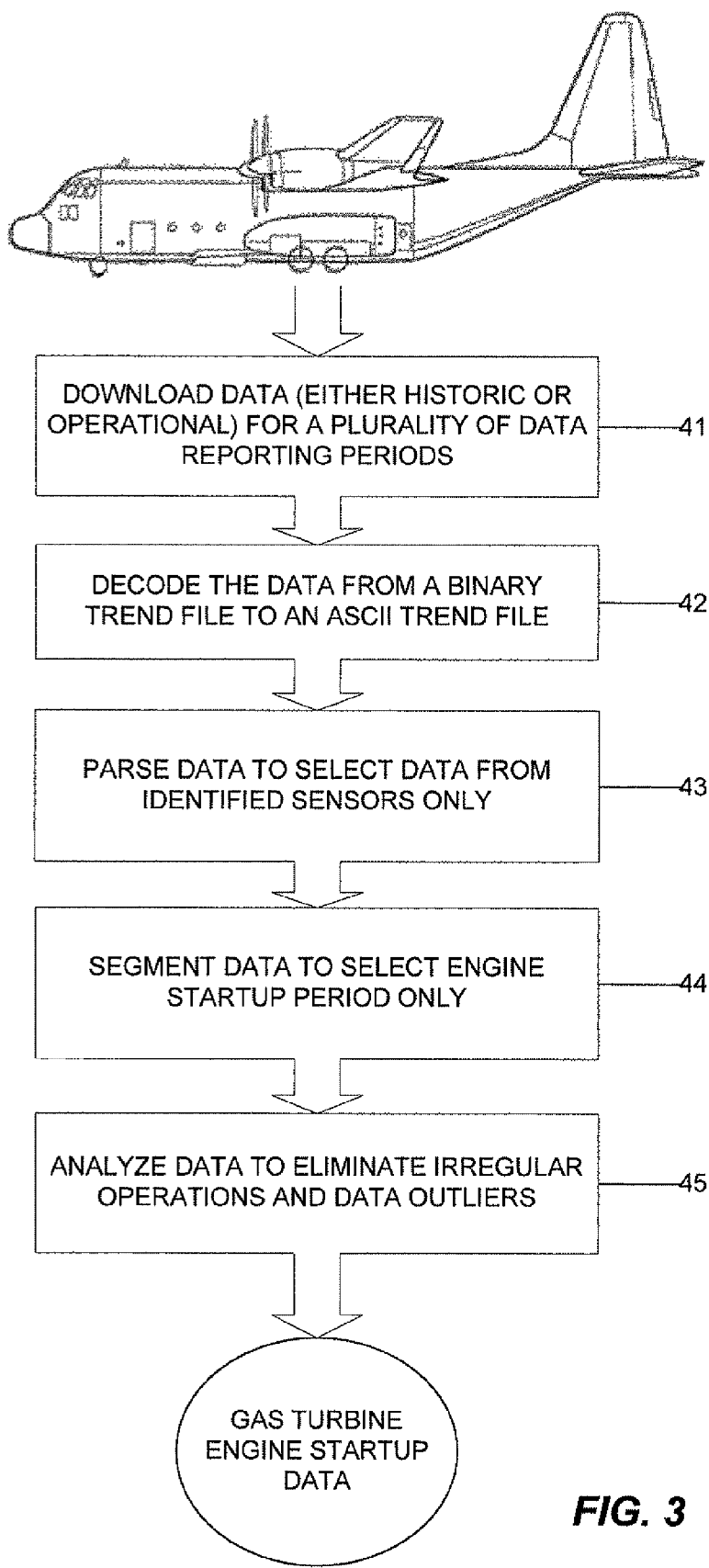
FIG. 3 is a schematic block flow diagram showing the steps of downloading either historical or operational data from identified legacy gas turbine engine sensors for a plurality of data reporting periods according to an embodiment of the present invention.

As is perhaps best illustrated in FIG. 3, the step of downloading onto a computer the historic gas turbine engine startup data (block 40) and the step of downloading onto the computer gas turbine engine startup data (block 80) each further include the steps of: downloading gas turbine engine data from a plurality of gas turbine engine sensors for one or more data reporting periods (block 41), decoding the gas turbine engine data from a binary trend file to an ASCII trend file (block 42), parsing the gas turbine engine data to select data from the identified one or more sensors usable to predict failure of a starter control valve of an engine of the gas turbine engine model prior to an event of failure (block 43), segmenting the gas turbine engine data to select only gas turbine engine startup data (block 44), and analyzing the gas turbine engine startup data to reduce irregular gas turbine engine operations and data outliers (block 45).

According to an embodiment of the present invention, for example, the historic gas turbine engine startup data and the gas turbine engine startup data can be downloaded from the one or more sensors of the same vehicle. In other words, computer implemented methods according to various embodiments of the present invention can be implemented with input data from a single vehicle as opposed to two vehicles where one vehicle serves as an historical gas turbine engine startup data model and the other vehicle serves as the test vehicle whereby the method is used to identify a potential predictive starter control valve failure point. In a single vehicle scenario, both historical gas turbine engine startup data and current operational gas turbine engine startup data can be obtained from sensors of the one vehicle. Beneficially, a vehicle's own historic gas turbine engine startup data can be used to determine potential predictive starter control valve failure points. Various embodiments of the present invention, for example, do not require a generic historic data model in order to accurately predict the failure of a gas turbine engine starter control valve.

According to an embodiment of the present invention, the step of applying data specific to the gas turbine engine model to determine if the potential predictive starter control valve failure point is a false positive indication of a starter control valve failure (block 130) can further include the steps of displaying via a graphical user interface device of the computer the potential predictive starter control valve failure point, and receiving input via a user interface input device of the computer from a user indicating whether the potential predictive starter control valve failure point is a false positive indication of a starter control valve failure. The graphical user interface can include, for example, a CRT monitor, a LCD monitor, a plasma monitor, a OLED screen, a television, a DLP monitor, a video projection, a three-dimensional projection, or a touch screen. The user interface input device can include, for example, a keyboard, a mouse, a touch screen, a tablet computer, a handwriting recognition enabled tablet computer, voice recognition software, or gesture recognition software.

Beneficially, various embodiments of the present invention can reduce false positive indications of a starter control valve failure by applying data specific to the gas turbine engine model. By including data specific to the gas turbine engine model in the starter control valve failure point analysis, such an embodiment of the present invention can verify the potential starter control valve failure. For example, such an embodiment of the present invention can determine a potential predictive starter control valve failure point where one of the one or more health indices correlates to the starter control valve health prognostic for the gas turbine engine model. However, there can be scenarios where various embodiments of the present invention determine a potential predictive starter control valve failure point that is merely a false indication of a potential starter control valve failure. For example, according to the present invention, false positive potential predictive starter control valve failure point identifications can be reduced in instances where knowledge of the particular vehicle, the gas turbine engine model, or the gas turbine engine in particular indicates that the appearance of the starter control valve pre-failure signature is due to a cause other than a starter control valve failure.

Figure 4:
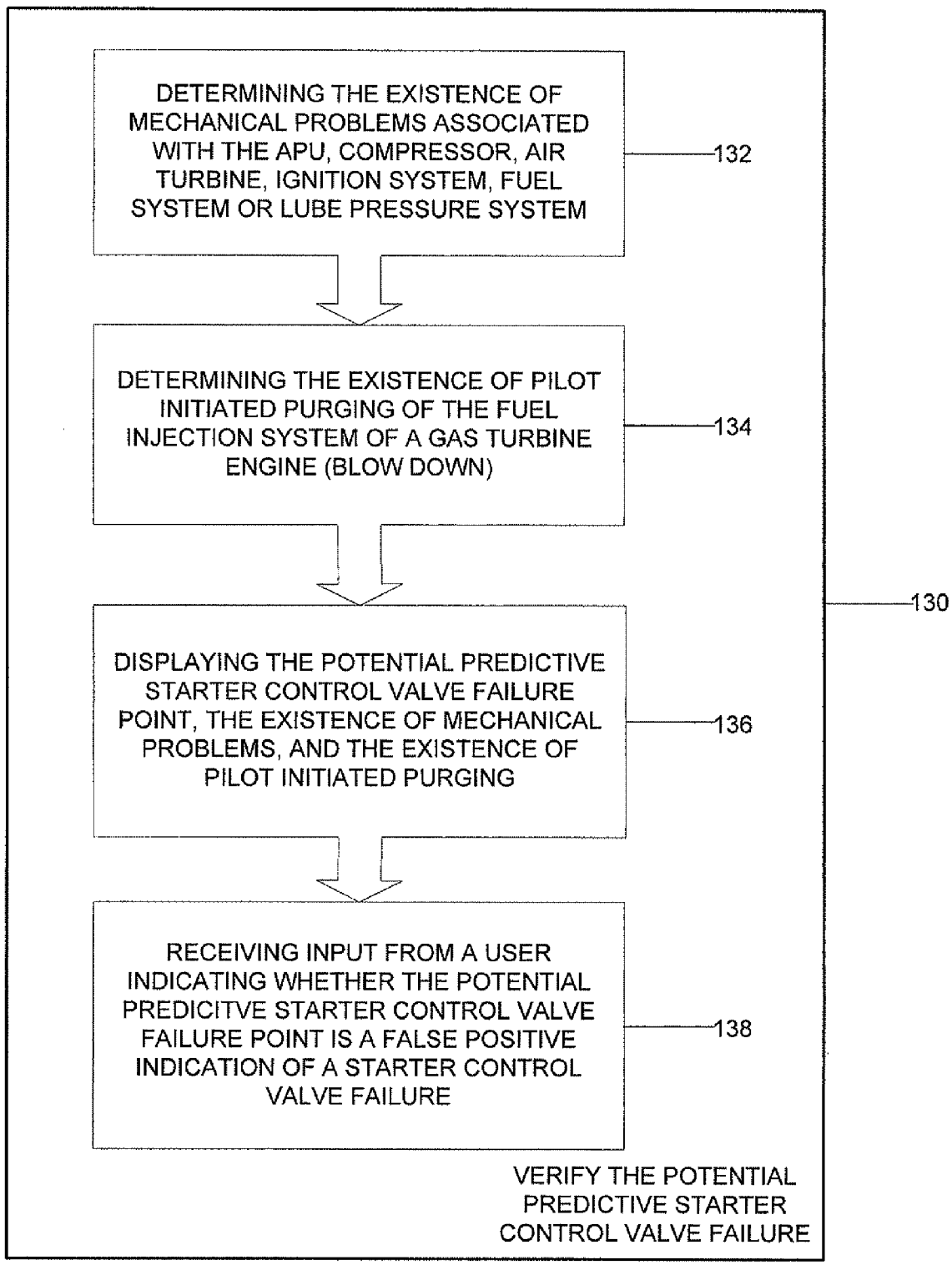
FIG. 4 is a schematic block flow diagram of the step of verifying a potential predictive starter control valve failure point according to an embodiment of the present invention.

As illustrated in FIG. 4, an embodiment of the present invention can beneficially verify that the potential predictive starter control valve failure point is indeed a positive predictor of a starter control valve failure by applying data associated with the gas turbine engine model or the aircraft associated with the gas turbine engine model (block 130). According to various embodiments of the present invention, the data associated with the gas turbine engine model can include, for example, operational gas engine startup data, historic gas turbine engine startup data, and RPM sensor data, and such data can be beneficially obtained, for instance, from gas turbine engine sensors and other aircraft sensors. Specifically, in the exemplary case of an aircraft, embodiments of the present invention can include the step of analyzing operational gas turbine engine RPM sensor data received for the at least one gas turbine engine startup of the one or more operational gas turbine engines of the certain gas turbine engine model. Moreover, various embodiments of the present invention can beneficially include the steps of determining the existence of one or more mechanical problems associated with one or more of an auxiliary power unit, a compressor, an air turbine, an ignition system, a fuel system, or a lube pressure system of an aircraft at a potential predictive starter control valve failure point (block 132), and determining the existence of pilot initiated purging of the fuel injection system of a gas turbine engine of an aircraft at a potential predictive starter control valve failure point (block 134). The steps of determining the existence of one or more mechanical problems and determining the existence of pilot initiated purging of the fuel injection system can beneficially be, for example, responsive to the step of analyzing operational gas turbine engine RPM sensor data. Additionally, various embodiments of the present invention can display via a graphical user interface device the potential predictive starter control valve failure points and responsive to the determining, the existence of one or more mechanical problems and the existence of pilot initiated purging (block 136). Responsive to the displaying, various embodiments of the present invention can receive input from a user via a user interface input device indicating whether the potential predictive starter control valve failure point is a false positive indication of a starter control valve failure (block 138).

Moreover, the step of applying data associated with the gas turbine engine model or the aircraft associated with the gas turbine engine model (block 130) can be implemented using a computer process. For example, a computer implemented method according to an embodiment of the present invention can include the step of reducing, in a sixth computer process by the second computer, false positive indications of a starter control valve failure to thereby verify the potential predictive starter control valve failure point (block 130). This particular step can be accomplished, by way of example, by determining the existence of one or more mechanical problems associated with one or more of an auxiliary power unit, a compressor, an air turbine, an ignition system, a fuel system, or a lube pressure system of the second vehicle at the potential predictive starter control valve failure point (block 132), and determining the existence of pilot initiated purging of the fuel injection system of the identified gas turbine engine of the second vehicle at the potential predictive starter control valve failure point (block 134). Such a computer implemented method according to various embodiments of the present invention can further include the steps of storing the historic gas turbine engine startup data in a first database associated with the first computer, storing the subset of health index features in a second database associated with the first computer, storing the starter control valve health prognostic for the vehicle model in a third database associated with the first computer, storing the gas turbine engine startup data in a fourth database associated with the second computer, and storing the one or more starter control valve health indices in a fourth database associated with the second computer.

Figure 5:
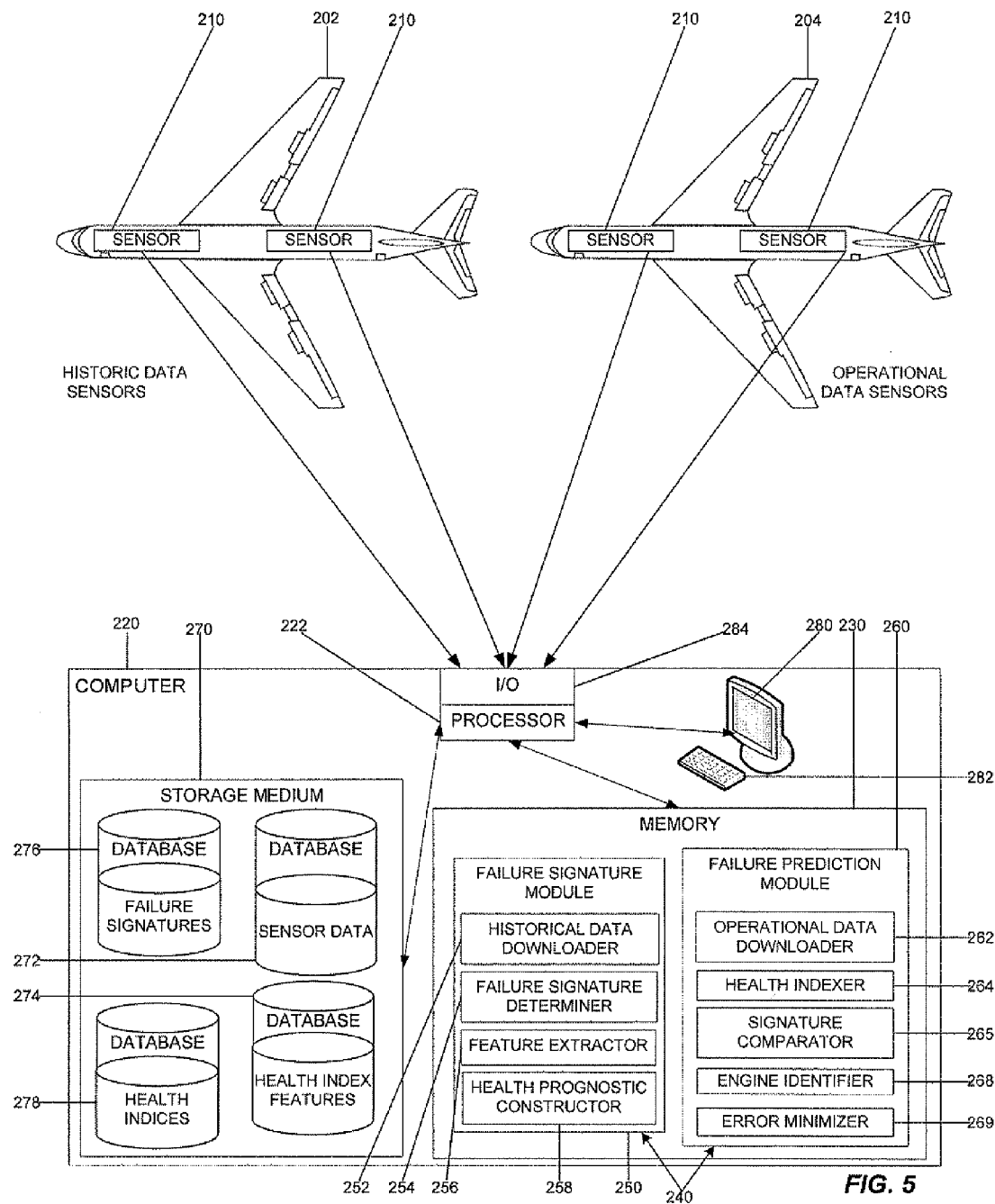
FIG. 5 is a schematic block diagram of a system to predict starter control valve failures in gas turbine engines using a starter control valve health prognostic according to an embodiment of the present invention.

Various embodiments of the present invention can also include a system to predict starter control valve failures in gas turbine engines using a starter control valve health prognostic. FIG. 5, for example, illustrates a system to predict starter control valve failures in gas turbine engines using a starter control valve health prognostic where legacy gas turbine engine sensor data is downloaded from legacy gas turbine engine sensors of two aircraft according to an embodiment of the present invention. Specifically, a system as illustrated in FIG. 5 can include a first aircraft having one or more gas turbine engines of a certain gas turbine engine model 202, a second aircraft having one or more gas turbine engines of the same certain gas turbine engine model 204, and a computer 220 having at least a processor 222, a memory 230, and at least one computer readable program product stored in the memory 240 of the computer 130. The first aircraft 202 and the second aircraft 204 can each include, for example, one or more legacy gas turbine engine sensors 210 usable to predict failure of a starter control valve of a gas turbine engine of the certain gas turbine engine model.

Also according to an embodiment of the present invention, the computer readable program product 240 can include a failure signature module 250 and a failure prediction module 260. The failure signature module 250 can further include, for example, an historic data downloader 252 to download gas turbine engine startup data from the identified one or more sensors 210 for a plurality of engine startups of the first aircraft 202 where one of the plurality of engine startups failed due to a starter control valve failure to thereby define historic gas turbine engine startup data, a starter control valve pre-failure signature determiner 254 to analyze the historic gas turbine engine startup data for each of the plurality of engine startups to determine a starter control valve pre-failure signature for the certain gas turbine engine model, and a feature extractor 256 to extract a subset of features of the starter control valve pre-failure signature for the certain gas turbine engine model to facilitate automatic detection of the starter control valve pre-failure signature to thereby define health index features. Beneficially, the failure signature module can also include a health prognostic constructor 258, for example, to generate a starter control valve health prognostic for the certain gas turbine engine model responsive to the health index features.

The failure prediction module 260, according to an embodiment of the present invention can, for example, include an operational data downloader 262 to download gas turbine engine startup data from the second aircraft 204 for one or more engine startups and a health indexer 264 to extract the health index features for each of the one or more engine startups from the gas turbine engine startup data and to calculate a starter control valve health index for each of the one or more engine startups responsive to the health index features for each of the one or more engine startups. The failure prediction module 260 can also beneficially include a signature comparator 265 to compare each of the one or more health indices with the starter control valve health prognostic for the certain gas turbine engine model to identify a potential predictive starter control valve failure for the second aircraft 204 where one of the one or more health indices correlates to the starter control valve health prognostic for the certain gas turbine engine model to thereby define a potential predictive starter control valve failure point. Additionally, the system can include a gas turbine engine identifier 268 to identify the gas turbine engine of the second aircraft 204 associated with the potential predictive starter control valve failure point and an error minimizer 269 to determine if the potential predictive starter control valve failure point is a false positive indication of a starter control valve failure by applying data specific to the gas turbine engine model. Specifically, the error minimizer 269 can be configured to determine the existence of one or more mechanical problems associated with one or more of an auxiliary power unit, a compressor, an air turbine, an ignition system, a fuel system, or a lube pressure system of an aircraft at a potential predictive starter control valve failure point. Moreover, the error minimizer 269 can determine the existence of pilot initiated purging of the fuel injection system of a gas turbine engine of an aircraft at a potential predictive starter control valve failure point.

The computer 220, according to an embodiment of the present invention, can further include a computer readable storage medium 270. Furthermore, the computer readable storage medium 270 can include at least a first 272, second 274, third 276, and fourth databases 278, the first database 272 including a plurality of gas turbine engine sensor data, the second database 274 including a plurality of health index features, the third database 276 including a starter control valve health prognostic for one or more gas turbine engine models, and the fourth database 278 including a plurality of health indices. Also according to an embodiment of the present invention, the starter control valve pre-failure signature determiner 254 can store the historic gas turbine engine startup data in the first database 272, the feature extractor 256 can store the health index features in the second database 274, the health prognostic constructor 258 can store the starter control valve health prognostic for the certain gas turbine engine model in the third database 276, the operational data downloader 262 can store the gas turbine engine startup data in the first database 272, and the health indexer 264 can store the one or more starter control valve health indices in the fourth database 278. Moreover, the historic data downloader 252 and the operational data downloader 262 can each download gas turbine engine data from a plurality of gas turbine engine sensors 210 for one or more data reporting periods, decode the gas turbine engine data from a binary trend file to an ASCII trend file, parse the gas turbine engine data to select data from the identified one or more sensors 210 usable to predict failure of a starter control valve of an engine of the gas turbine engine model prior to an event of failure, segment the gas turbine engine data to select only gas turbine engine startup data, and analyze the gas turbine engine startup data to reduce irregular gas turbine engine operations, aircraft operations, and data outliers.

According to an embodiment of the present invention, the first aircraft 202 and the second aircraft 204 can be the same aircraft. That is, the system to predict starter control valve failures in gas turbine engines using a starter control valve health prognostic, according to an embodiment of the present invention, can be implemented with input data from a single aircraft as opposed to two aircraft where one aircraft serves as an historical gas turbine engine startup data model and the other aircraft serves as the test aircraft. In a single aircraft scenario, both historical gas turbine engine startup data and current operational gas turbine engine startup data can be obtained from sensors 210 of the one aircraft. Beneficially, an aircraft's own historic gas turbine engine startup data can be used to determine potential predictive starter control valve failure points. Various embodiments of the present invention, for example, do not require a generic historic data model in order to accurately predict the failure of a gas turbine engine starter control valve.

Figure 6:
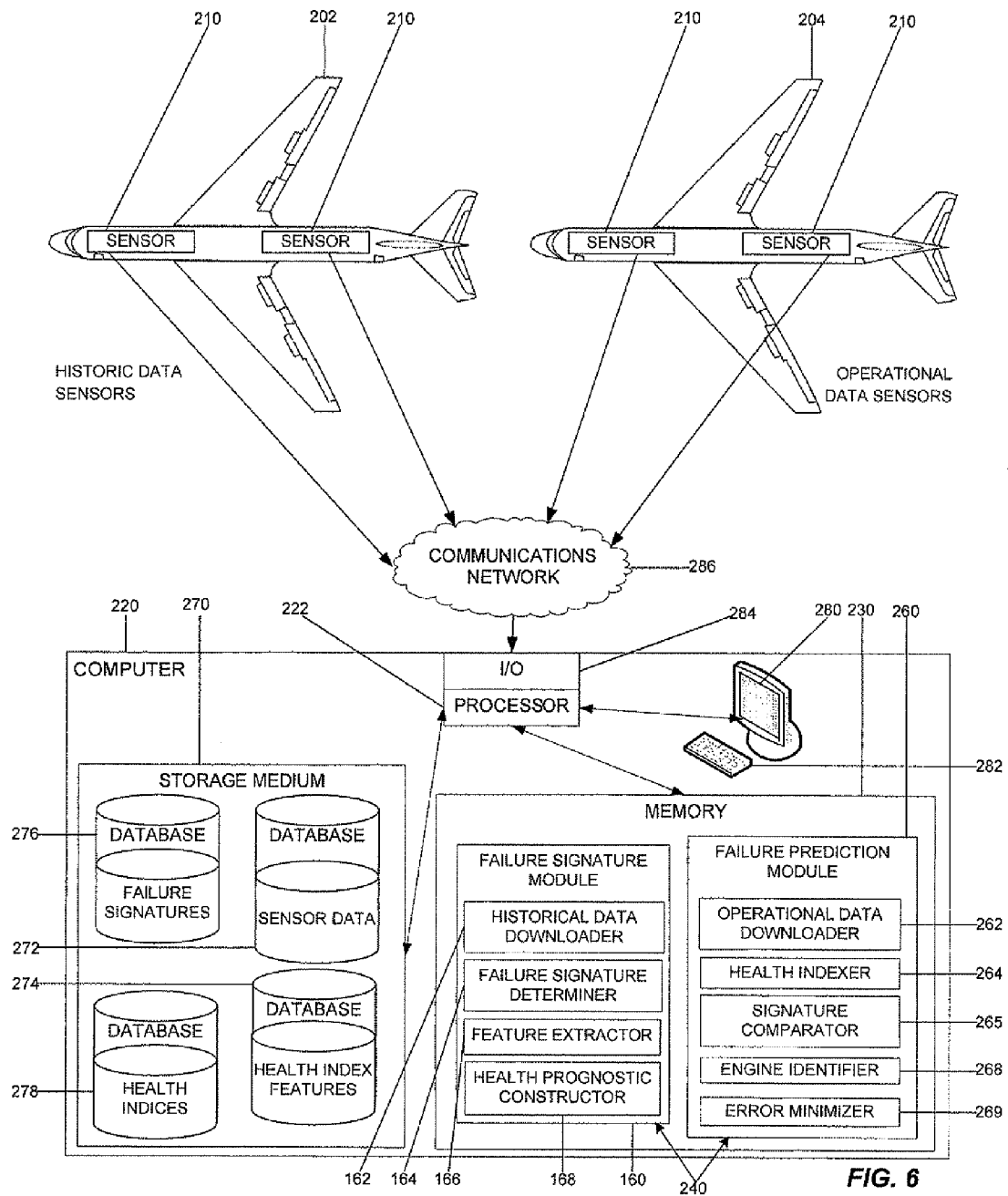
FIG. 6 is a schematic block diagram of a system to predict starter control valve failures in gas turbine engines using a starter control valve health prognostic and a communications network according to an embodiment of the present invention.

Additionally, according to an embodiment of the present invention, the computer 220 can further include a graphical user interface device 280 and a user interface input device 282. Accordingly, the error minimizer can display, via the graphical user interface device 280 of the computer 220, the potential predictive starter control valve failure point and receive input via the user interface input device 282 of the computer 220 from a user indicating whether the potential predictive starter control valve failure point is a false positive indication of a starter control valve failure. As perhaps is best illustrated in FIG. 6, a system to predict starter control valve failures in gas turbine engines using a starter control valve health prognostic can also include, for example, a communications network 286. For example, FIG. 6 illustrates a system to predict starter control valve failures in gas turbine engines using a starter control valve health prognostic where legacy gas turbine engine sensor data is downloaded from legacy gas turbine engine sensors 210 via a communications network 286 according to an embodiment of the present invention. The primary difference between FIG. 5 and FIG. 6 is the addition of the communications network 286 to the system. According to an embodiment of the present invention, the historic data downloader 252 and the operational data downloader 262 can each download engine startup data from the identified one or more sensors 210 for a plurality of engine startups via the communications network 286.

Figure 7:
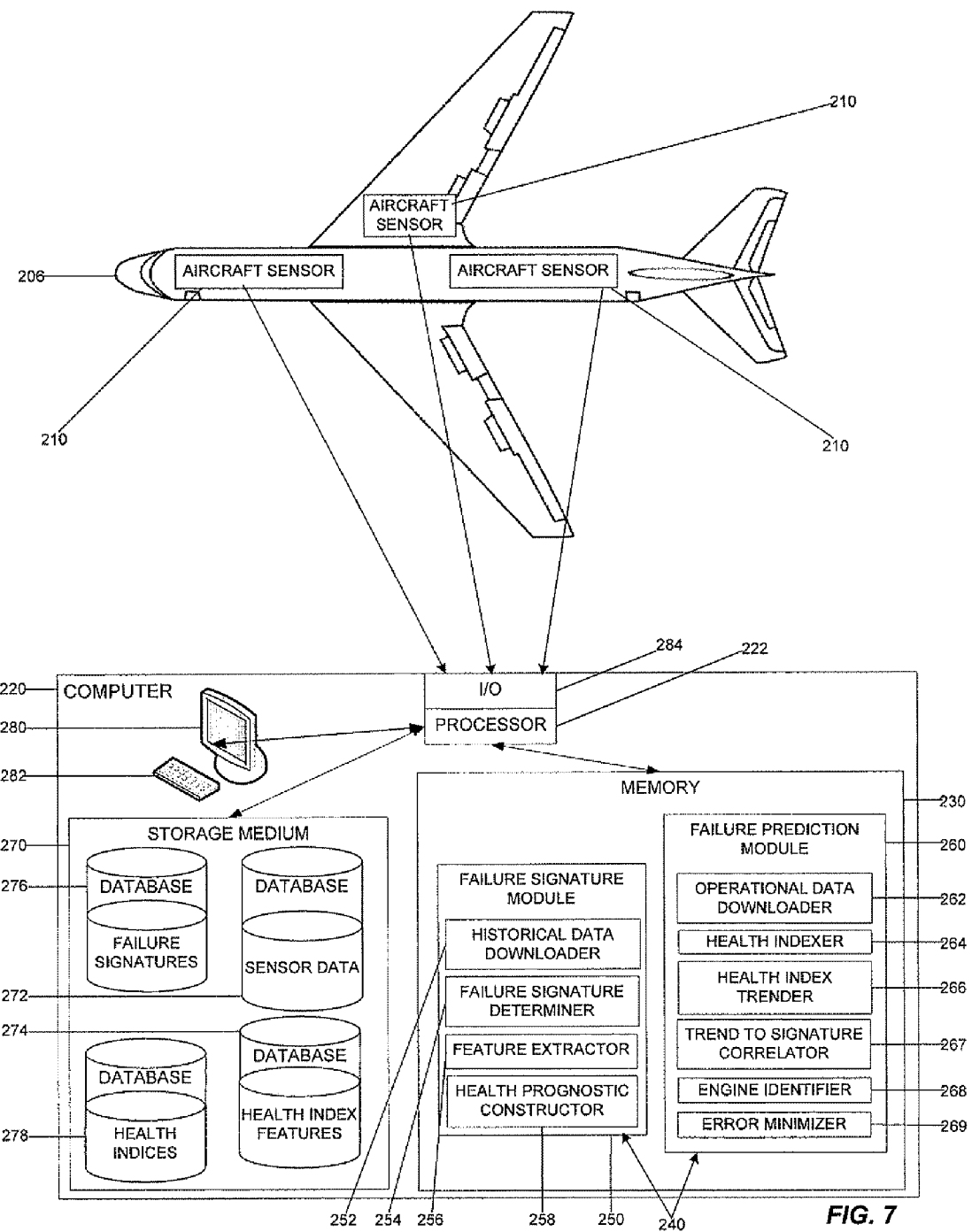
FIG. 7 is a schematic block diagram of a system to predict starter control valve failures in gas turbine engines using a continuous starter control valve deterioration trend function according to an embodiment of the present invention.

Various embodiments of the present invention can also include a system to predict and trend starter control valve failures in gas turbine engines using a starter control valve health prognostic and a continuous starter control valve deterioration trend function. FIG. 7, for example, illustrates a system to predict and trend starter control valve failures in gas turbine engines if an aircraft using a starter control valve health prognostic and a continuous starter control valve deterioration function where legacy gas turbine engine sensor data is downloaded from legacy gas turbine engine sensors 210 according to an embodiment of the present invention. The system to predict and trend starter control valve failures can include an aircraft 206 having one or more gas turbine engines of a certain gas turbine engine model and a computer 220 having at least a processor 222, a memory 230, a computer readable storage medium 270, at least one database stored in the compute readable storage medium, and a computer readable program product 240 stored in the memory 230 of the computer. The aircraft 206 can include, for example, one or more legacy gas turbine engine sensors 210 usable to predict failure of a starter control valve of an engine of the certain gas turbine engine model. According to an embodiment of the present invention, the at least one database can include a first 272, second 274, third 276, and fourth database 276, the first database 272 including a plurality of gas turbine engine sensor data, the second database 274 including a plurality of health index features, the third database 276 including a starter control valve health prognostic for one or more gas turbine engine models, and the fourth database 278 including a plurality of health indices.

The computer readable program product 240 stored in the memory 230 of the computer 220, can include, for example, a failure signature module 250 and a failure prediction module 260. The failure signature module 250, for example, can include an historic data downloader 252, a starter control valve pre-failure signature determiner 254, a feature extractor 256, and a health prognostic constructor 258. The historic data downloader 252, for example, can download gas turbine engine startup data from the identified one or more sensors 210 for a plurality of engine startups of the aircraft 206 where one of the plurality of engine startups failed due to a starter control valve failure to thereby define historic gas turbine engine startup data. The starter control valve pre-failure signature determiner 254, for example, can store the historic gas turbine engine startup data in the first database 272 and can analyze the historic gas turbine engine startup data stored in the first database 272 for each of the plurality of engine startups to determine a starter control valve pre-failure signature for the certain gas turbine engine model. Additionally, according to an embodiment of the present invention, the feature extractor 256 can extract a subset of features of the starter control valve pre-failure signature for the certain gas turbine engine model to facilitate automatic detection of the starter control valve pre-failure signature to thereby define health index features and can store the health index features in the second database 274. The health prognostic constructor 258, for example, can generate a starter control valve health prognostic for the certain gas turbine engine model responsive to the health index features stored in the second database 274 and can store the starter control valve health prognostic for the certain gas turbine engine model in the third database 276.

Also according to an embodiment of the present invention, the failure prediction module 160 can include an operational data downloader 262, a health indexer 264, a health index trender 266, a trend to signature correlator 266, a gas turbine engine identifier 268, and an error minimizer 269. The operational data downloader 262, for example, can download gas turbine engine startup data from the aircraft 206 for a plurality of engine startups and can store the gas turbine engine startup data in the first database 272. Additionally, the health indexer 264 can extract the health index features for each of the plurality of engine startups from the gas turbine engine startup data stored in the first database 272. Beneficially, the health indexer 264 can also calculate a starter control valve health index for each of the plurality of engine startups responsive to the health index features for each of the plurality of engine startups and can store the plurality of starter control valve health indices in the fourth database 278. Also according to an embodiment of the present invention, the health index trender 266 can, for example, construct a continuous starter control valve deterioration trend function responsive to the plurality of starter control valve health indices stored in the fourth database 278. The trend to signature correlator 266 can beneficially analyze the continuous starter control valve deterioration trend function to identify a potential predictive starter control valve failure point for the aircraft 206 where a point of the starter control valve deterioration trend function correlates to the starter control valve health prognostic for the certain gas turbine engine model stored in the third database 276. Benefically, the unctions of the health index trender 266 and the trend to signature correlator 267 can be performed by a single signature comparator stored in the memory of the computer. Moreover, the gas turbine engine identifier 268 can, for example, can identify the gas turbine engine of the second aircraft 206 associated with the potential predictive starter control valve failure point, and the error minimizer 269 can determine if the potential predictive starter control valve failure point is a false positive indication of a starter control valve failure by applying data specific to the gas turbine engine model.

The historic data downloader 252 and the operational data downloader 262 can each, according to an embodiment of the present invention, download gas turbine engine data from a plurality of gas turbine engine sensors 210 for a plurality of data reporting periods, decode the gas turbine engine data from a binary trend file to an ASCII trend file, parse the gas turbine engine data to select data from the identified one or more sensors 210 usable to predict failure of a starter control valve of an engine of the gas turbine engine model prior to an event of failure, segment the gas turbine engine data to select only gas turbine engine startup data, and analyze the gas turbine engine startup data to reduce irregular aircraft operations, gas turbine engine operations, and data outliers. Additionally, the computer 220 can include a graphical user interface device 280 and a user interface input device 282. In embodiments that include a graphical user interface device 280 and a user interface input device 282, the trend to signature correlator, for example can display via the graphical user interface 280 of the computer 220 the continuous starter control valve deterioration trend function and receive input via a user interface input device 282 of the computer 220 from a user identifying a potential predictive starter control valve failure point where a point on the starter control valve deterioration trend function correlates to the starter control valve health prognostic for the gas turbine engine model stored in the database. Likewise, the error minimizer 269 can display via the graphical user interface device 280 of the computer 220 the potential predictive starter control valve failure point and receive input via the user interface input device 282 of the computer 220 from a user indicating whether the potential predictive starter control valve failure point is a false positive indication of a starter control valve failure.

Figure 8:
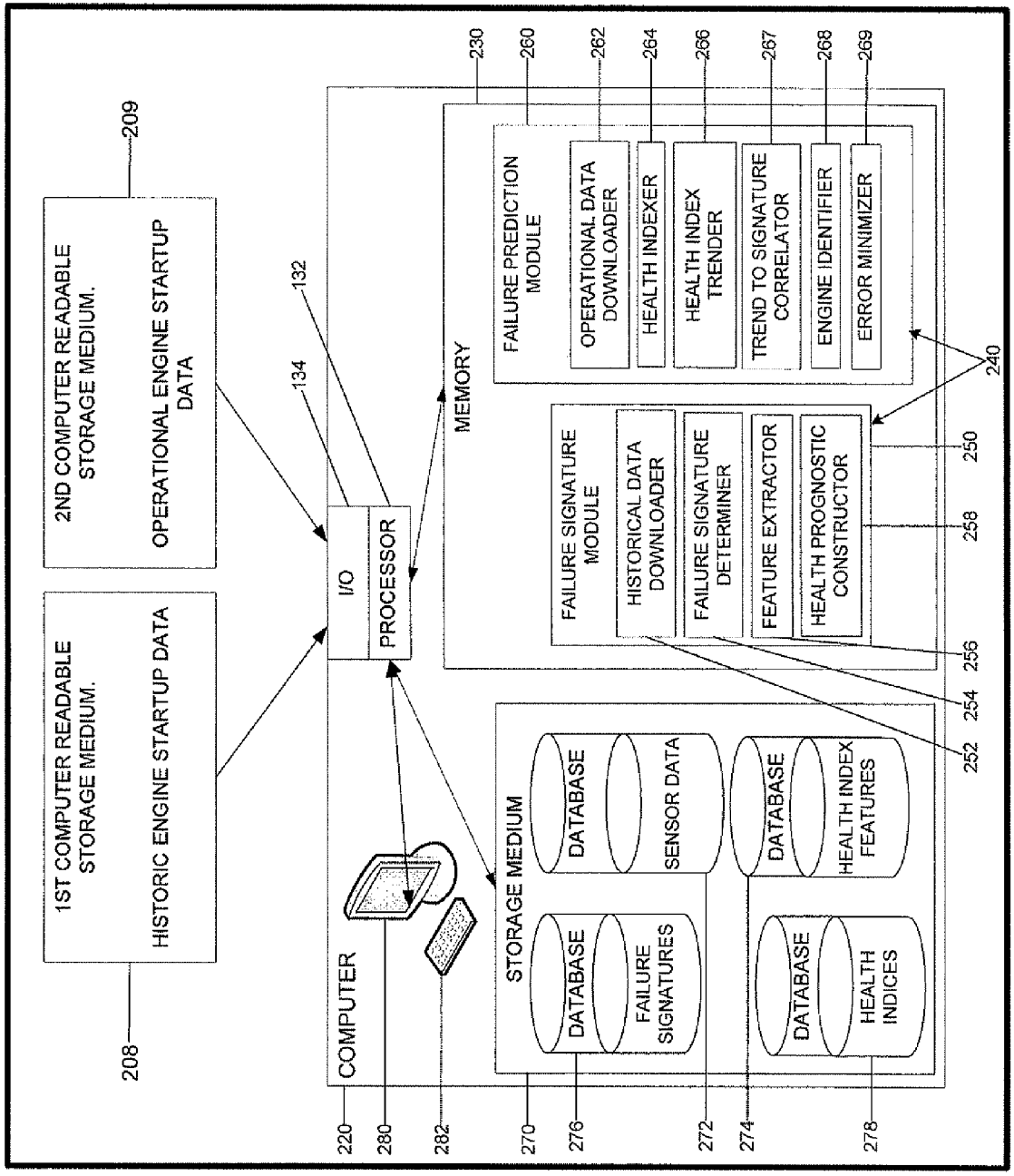
FIG. 8 is a schematic block diagram of a starter control valve failure prediction machine to predict and trend starter control valve failures in gas turbine engines using a starter control valve health prognostic according to an embodiment of the present invention.

FIG. 8, for example, illustrates a starter control valve failure prediction machine to predict and trend starter control valve failures in gas turbine engines using a starter control valve health prognostic and a continuous starter control valve deterioration function where historic legacy gas turbine engine sensor data is downloaded from a first computer readable storage medium 208 and operational legacy gas turbine engine sensor data is downloaded from a second computer readable storage medium 209 according to an embodiment of the present invention. As illustrated in FIG. 8, the starter control valve failure prediction machine can include, for example, a first computer readable storage medium 208, a second computer readable storage medium 209, a computer 220 adapted to be in communication with the first computer readable storage medium 208 and the second computer readable storage medium 209 and having at least a processor 222, a memory 230, a computer readable storage medium 270, a computer readable program product 240 stored in the memory 230 of the computer 220, and at least one database stored in the computer readable storage medium 270. In the exemplary case of an aircraft, the first computer readable storage medium 208, for example, can store historic gas turbine engine startup data from one or more legacy gas turbine engine sensors 210 of a certain gas turbine engine model usable to predict failure of a starter control valve of a gas turbine engine for a plurality of engine startups of a gas turbine engine of a certain gas turbine engine model where one of the plurality of engine startups failed due to a starter control valve failure. The second computer readable storage medium 209, for example, can store gas turbine engine startup data from one or more legacy gas turbine engine sensors 210 of a selected gas turbine model usable to predict failure of a starter control valve of a gas turbine engine for a plurality of gas turbine engine startups.

According to an embodiment of the present invention, the at least one database can further include a first 272, second 274, third 276, and fourth databases 278. For example, the first database 272 can include a plurality of gas turbine engine sensor data, the second database 274 can include a plurality of health index features, the third database 276 can include a starter control valve health prognostic for one or more gas turbine engine models, and the fourth database 278 can include a plurality of health indices. Additionally, the computer readable program product 240 stored in the memory 230 of the computer 220, for example, can include a failure signature module 250 and a failure prediction module 260. The failure signature module 250 can further include, for example, an historic data downloader 252, a failure signature determiner 254, a feature extractor 256, and a health prognostic constructor 258. The historic data downloader 252, for example, can download the historic gas turbine engine startup data from the first computer readable storage medium 208 and the failure signature determiner 254 can store the historic gas turbine engine startup data in the first database 272 and can analyze the historic gas turbine engine startup data stored in the first database 272 for each of the plurality of engine startups to generate a starter control valve pre-failure signature for the certain gas turbine engine model. Additionally, the feature extractor 256 can extract a subset of features of the starter control valve pre-failure signature for the certain gas turbine engine model to facilitate automatic detection of the starter control valve pre-failure signature to thereby define health index features and can store the health index features in the second database 274. Also according to an embodiment of the present invention, the health prognostic constructor 258 can generate a starter control valve health prognostic for the certain gas turbine engine model responsive to the health index features stored in the second database 274 and can store the starter control valve health prognostic for the certain gas turbine engine model in the third database 276.

According to an embodiment of the present invention, the failure prediction module 260 can further include an operational data downloader 262, a health indexer 264, a health index trender 266, a trend to signature correlator 266, a gas turbine engine identifier 268, and an error minimizer 269. The operational data downloader 262, for example, can download gas turbine engine startup data from the second computer readable storage medium 209 and can store the gas turbine engine startup data in the first database 272. Additionally, the health index trender 266 can extract the health index features for each of the plurality of engine startups from the gas turbine engine startup data stored in the first database 272. Beneficially, the health index trender 266 can also calculate a starter control valve health index for each of the plurality of engine startups responsive to the health index features for each of the plurality of engine startups and can store the one or more starter control valve health indices in the fourth database 278.

According to an embodiment of the present invention, the health index trender 266 can construct a continuous starter control valve deterioration trend function responsive to the plurality of starter control valve health indices stored in the fourth database 278, and the trend to signature correlator 266 can analyze the continuous starter control valve deterioration trend function to identify a potential predictive starter control valve failure point where a point of the starter control valve deterioration trend function correlates to the starter control valve health prognostic for the certain gas turbine engine model stored in the third database 276. Moreover, the gas turbine engine identifier 268 can identify the gas turbine engine associated with the potential predictive starter control valve failure point, and the error minimizer 269 can determine if the potential predictive starter control valve failure point is a false positive indication of a starter control valve failure by applying data specific to the gas turbine engine model. Additionally, according to an embodiment of the present invention, the first computer readable storage medium 208 and the second computer readable storage medium 209 can both be stored together on a third computer readable storage medium, and the third computer readable storage medium can be associated with, and can be in communication with, the computer 220.

Note, the computer 220, shown schematically in FIGS. 5 through 8, represents a computer or computer cluster or computer farm and is not limited to any individual physical computer. The number of computers along with associated storage capacity and their architecture and configuration can be increased responsive to usage, demand, and capacity requirements for the system. Also note, the memory 230 of the computer 220 can include volatile and nonvolatile memory known to those skilled in the art including, for example, RAM, ROM, and magnetic or optical disks, just to name a few. Note additionally, the computer readable program product stored in the memory 240 of the computer 220 can be in the form of microcode, programs, routines, and symbolic languages that provide a specific set or sets of ordered operations that control the functioning of the hardware and direct its operation, as known and understood by those skilled in the art. The computer readable program product, according to an embodiment of the present invention, for example, need not reside in its entirety in volatile memory, but can be selectively loaded, as necessary, according to various methodologies as known and understood by those skilled in the art.

Figure 9:
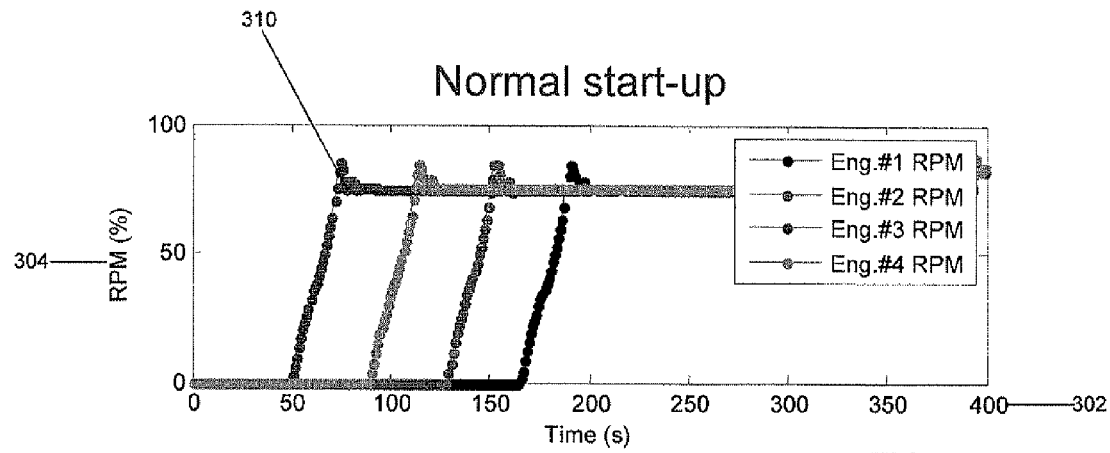
FIG. 9 is a two-dimensional line graph showing the starter control valve pre-failure signature of four gas turbine engines of a single aircraft during a normal, fault-free startup phase according to an embodiment of the present invention.
Figure 10:
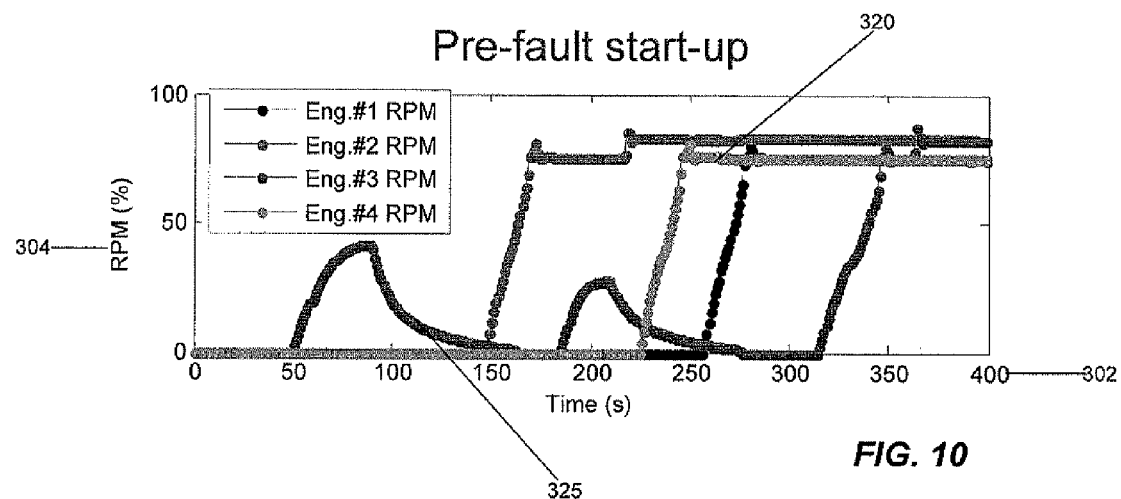
FIG. 10 is a two-dimensional line graph showing the starter control valve pre-failure signature of four gas turbine engines of a single aircraft during a pre-fault startup phase according to an embodiment of the present invention.

According to various embodiments of the present invention, there can be a direct correlation between the starter control valve pre-failure signature and a starter control valve health prognostic. Both signatures, for example, can be generated responsive to gas turbine engine startup data downloaded from sensors of a gas turbine engine model usable to predict the failure of a starter control valve of an engine of the gas turbine engine model prior to an event of failure. FIGS. 9-16, for example, illustrate this relationship in the exemplary context of one or more aircraft associated with one or more gas turbine engines of a certain gas turbine engine model. FIG. 9, for example, is a two-dimensional line graph with time in the horizontal axis 302 and gas turbine engine RPM percentage reported by gas turbine engine RPM sensors, one for each gas turbine engine, in the vertical axis 304. FIG. 9 shows the starter control valve pre-failure signature 310 of four gas turbine engines of a single aircraft during a normal, fault-free startup phase according to an embodiment of the present invention. FIG. 10, by contrast, is a two-dimensional line graph with time in the horizontal axis 302 and gas turbine engine RPM percentage reported by gas turbine engine RPM sensors, one for each gas turbine engine, in the vertical axis 304. FIG. 10 shows the starter control valve pre-failure signature 320 of four gas turbine engines of a single aircraft during a pre-fault startup phase according to an embodiment of the present invention. Specifically, FIG. 10 shows that that the RPM percentage of one gas turbine engine 325 is considerably lower than the other three gas turbine engines which each exhibit normal fault-free startup patterns.

Figure 11:
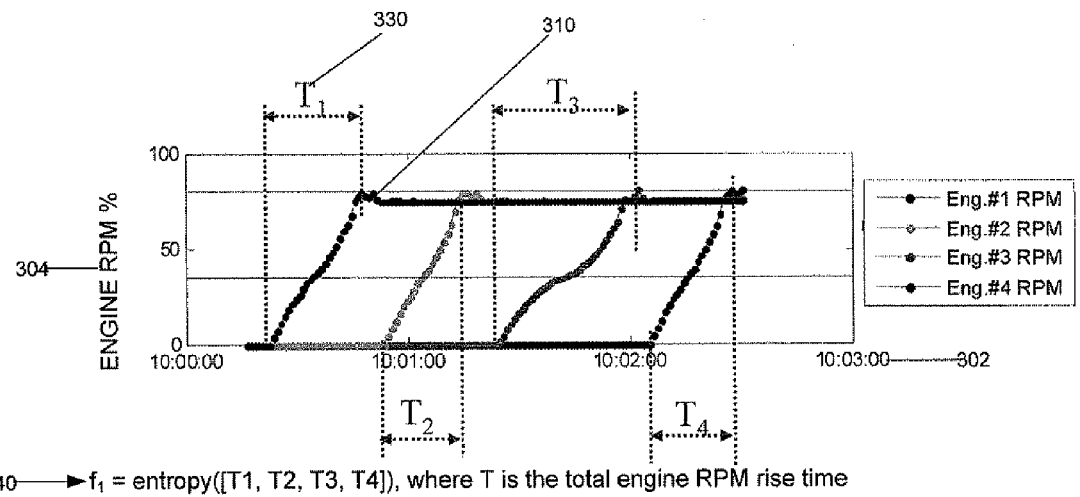
FIG. 11 is a two-dimensional line graph, with markings indicating associated health index features, showing the starter control valve pre-failure signature of four gas turbine engines of a single aircraft during a normal, fault-free startup phase according to an embodiment of the present invention.
Figure 12:
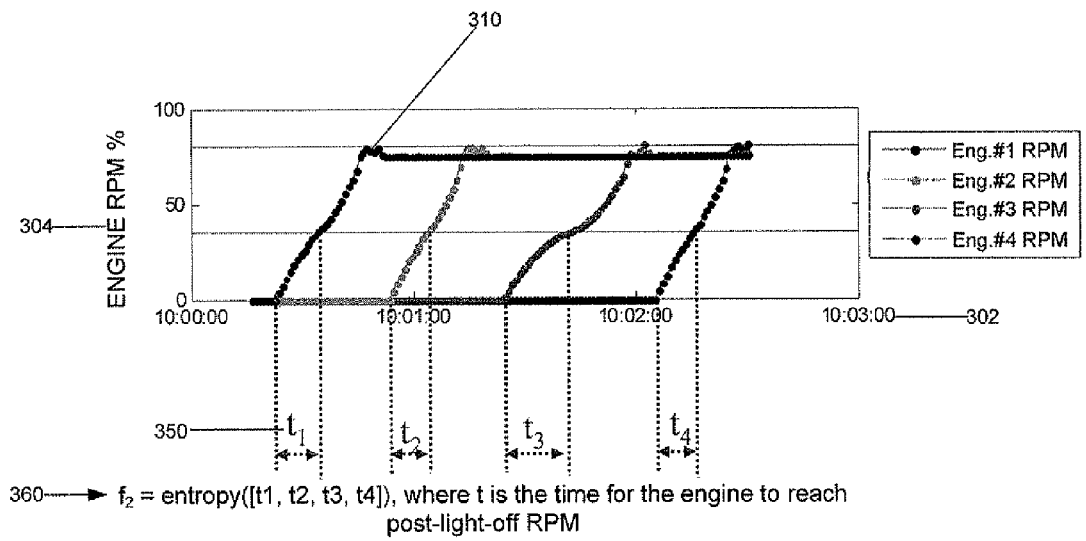
FIG. 12 is a two-dimensional line graph, with markings indicating associated health index features, showing the starter control valve pre-failure signature of four gas turbine engines of a single aircraft during a normal, fault-free startup phase according to an embodiment of the present invention.

Beneficially, although the startup fault typically occurs in only one of four gas turbine engines, as illustrated by FIG. 10, the systems, methods, and computer program products according to an embodiment of the present invention are able to construct a single starter control valve health prognostic for all four gas turbine engines that can easily be compared with operational data to predict the precise pre-failure point for a starter control valve of a gas turbine engine. FIGS. 11 and 12, for example, illustrate two possible health index features that can be extracted from the starter control valve signatures of each engine of an aircraft in order to construct a single starter control valve health prognostic, or health index, for the aircraft. FIG. 11, for example, is a two-dimensional line graph with time in the horizontal axis 302 and gas turbine engine RPM percentage reported by gas turbine engine RPM sensors, one for each gas turbine engine, in the vertical axis 304. Specifically, FIG. 11 shows the starter control valve pre-failure signature 310 of four gas turbine engines of a single aircraft during a normal, fault-free startup phase for each gas turbine engine. As illustrated by FIG. 11, the entropy of the total engine RPM rise time 330 of each of the four gas turbine engines is shown as an exemplary health index feature 340 which can be used to construct a starter control valve health threshold and a health index according to an embodiment of the present invention. Expressed mathematically, the health index of the aircraft illustrated by FIG. 11 is the entropy of T1, T2, T3, and T4, where T 330 is the total engine RPM rise time for each of the four gas turbine engines. A starter control valve health prognostic can be, for example, equivalent to a health index calculated for a particular period in time and responsive to the health index features.

Likewise, FIG. 12 is a two-dimensional line graph with time in the horizontal axis 302 and gas turbine engine RPM percentage reported by gas turbine engine RPM sensors, one for each gas turbine engine, in the vertical axis 304. Particularly, FIG. 12 shows the starter control valve pre-failure signature 310 of four gas turbine engines of a single aircraft during a normal, fault-free startup phase for each gas turbine engine. As illustrated by FIG. 12, the entropy 360 of the time 350 to reach post-light-off RPM for each of the four gas turbine engines is shown as an exemplary health index feature 360 which can be used to construct a starter control valve health prognostic and a health index according to an embodiment of the present invention. Expressed mathematically, the health index of the aircraft illustrated by FIG. 11 is the entropy of t1, t2, t3, and t4, where t 350 is the time to reach post-light-off RPM of each of the four gas turbine engines. A starter control valve health prognostic can be, for example, equivalent to a health index calculated for a particular period in time and responsive to the health index features.

The continuous starter control valve deterioration function can be a function of two variables, one variable representing one or more of the extracted health index features and the other representing the gas turbine engine startup number associated with the one or more of the extracted health index features. Additionally, the continuous starter control valve deterioration function can be constructed, for example, such that the mathematical limit of the continuous starter control valve deterioration trend function approaches zero as the gas turbine engine startup number associated with the one or more of the extracted health index features increases. Each gas turbine engine startup number can be beneficially associated, for example, with a gas turbine engine startup. A greater gas turbine engine startup number can indicate, for example, a gas turbine engine startup that occurred later in time to a gas turbine engine startup associated with a lower gas turbine engine startup number. In other words, gas turbine engine startup numbers can beneficially indicate a sequence of gas turbine engine startups in time. Accordingly, time and gas turbine engine startup numbers can be directly related. In such exemplary cases, time advances as each gas turbine engine startup number increases.

FIGS. 13, 14, 15, 16, 17, and 18 illustrate the above-described embodiment of the continuous starter control valve deterioration trend function of an aircraft with four gas turbine engines. FIGS. 13 and 14, for example, each show the two-dimensional graph of a continuous starter control valve deterioration trend function, however, each trend function is derived from a different extracted health index feature. FIG. 13, for example, graphs a continuous starter control valve deterioration trend function where the health indices upon which the trend function is based are derived from the entropy of the total engine RPM rise time of each of the four gas turbine engines. In the case of FIG. 13, the entropy of the total RPM rise time of each of the four gas turbine engines is the extracted health index feature. FIG. 14, by contrast, graphs a continuous starter control valve deterioration function where the health indices upon which the trend function is responsive to the entropy of the time to reach post-light-off RPM of each of the four gas turbine engines. In the case of FIG. 14, the entropy of the time to reach post-light-off RPM of each of the four gas turbine engines is the extracted index feature.

Specifically, FIG. 13 is a two-dimensional line graph with the gas turbine engine startup number associated with the one or more of the extracted health index features in the horizontal axis 406 and the value of the entropy function of the total engine RPM rise time of each of four gas turbine engines of a single aircraft in the vertical axis 402. The two-dimensional graph in FIG. 13 plots both a plurality of health indices of the aircraft 400, one for each startup period 406, and a continuous starter control valve deterioration trend function 390 responsive to the plurality of health indices of the aircraft 400, where the plurality of health indices of the aircraft 400 and the continuous starter control valve deterioration trend function 390 are responsive to the entropy of the total engine RPM rise time of each of the four gas turbine engines 402 according to an embodiment of the present invention. FIG. 14, on the other hand, is a two-dimensional line graph with the gas turbine engine startup number associated with the one or more of the extracted health index features in the horizontal axis 408 and the value of the entropy function of the time to reach post-light-off RPM of each of four gas turbine engines of a single aircraft in the vertical axis 404. FIG. 14, for example, plots both a plurality of health indices (shown at 420) of the aircraft and a continuous starter control valve deterioration trend function 410 responsive to the plurality of health indices (shown at 420) of the aircraft, where the plurality of health indices of the aircraft and the continuous starter control valve deterioration trend function 410 are responsive to the entropy 404 of the time to reach post-light-off RPM of each of the four gas turbine engines according to an embodiment of the present invention.

Figure 15:
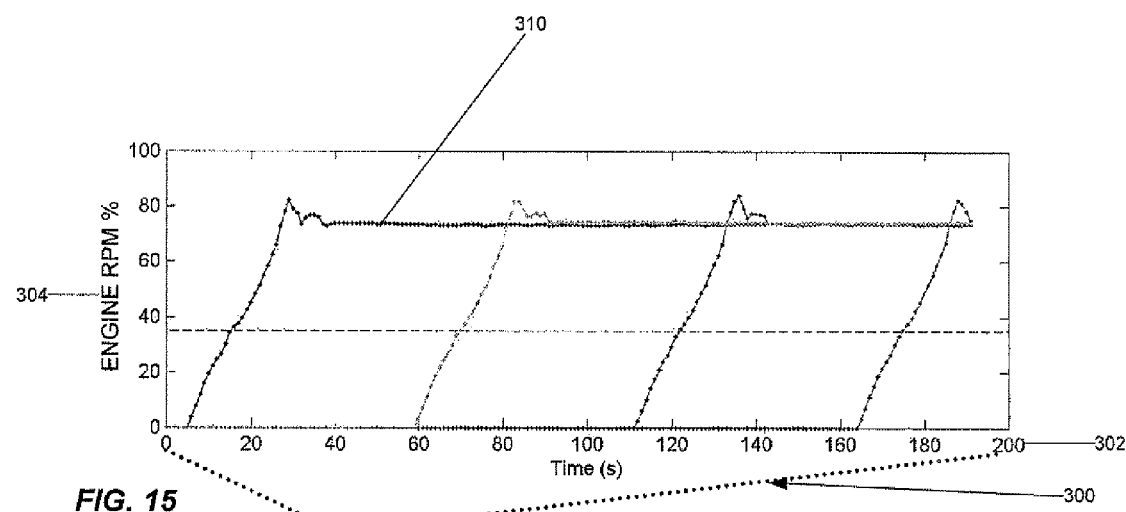
FIG. 15 is a two-dimensional line graph showing the starter control valve pre-failure signature of four gas turbine engines of a single aircraft during a normal, fault-free startup phase according to an embodiment of the present invention.
Figure 16:
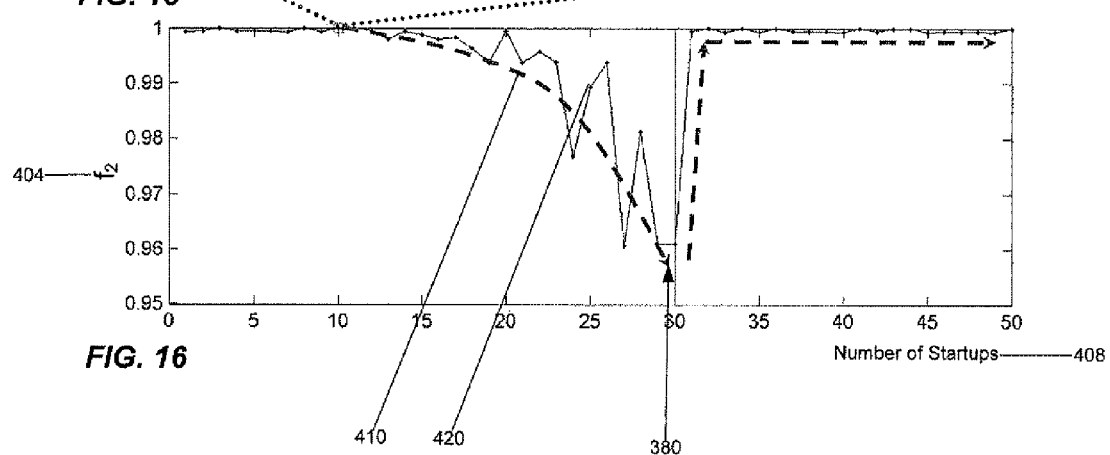
FIG. 16 is a two-dimensional line graph plotting both a plurality of health indices of the aircraft, one for each startup period, including the fault-free startup period shown in FIG. 15, and a continuous starter control valve deterioration trend function responsive to the plurality of health indices of the aircraft according to an embodiment of the present invention.

FIG. 15 illustrates the connection between a starter control valve signature, a starter control valve health prognostic, a health index, and a continuous starter control valve deterioration trend function. FIG. 15, for example, is a two-dimensional line graph with time in the horizontal axis 302 and gas turbine engine RPM percentage reported by gas turbine engine RPM sensors, one for each gas turbine engine, in the vertical axis 304. More specifically, FIG. 15 shows the starter control valve pre-failure signature 310 of four gas turbine engines of a single aircraft during a normal, fault-free startup phase according to an embodiment of the present invention. FIG. 16 is a two-dimensional line graph with the gas turbine engine startup number period associated with the one or more of the extracted health index feature in the horizontal axis 408 and the value 404 of the entropy function of the time to reach post-light-off RPM of each of four gas turbine engines of a single aircraft in the vertical axis. FIG. 16, for example, plots both a plurality of health indices (shown at 420) of the aircraft, one for each startup phase period, and a continuous starter control valve deterioration trend function 410 responsive to the plurality of health indices (shown at 420) of the aircraft, where the plurality of health indices (shown at 420) of the aircraft and the continuous starter control valve deterioration trend function 410 are responsive to the entropy 404 of the time to reach post-light-off RPM of each of the four gas turbine engines according to an embodiment of the present invention.

The dotted lines (shown at 300) between positioned between FIGS. 15 and 16 indicate how the starter control valve signature 310 for a single gas turbine engine startup period can be converted into a health index (shown at 420) and graphed alongside health indices from a plurality of other gas turbine engine startup periods according to an embodiment of the present invention. Stated differently, each health index (shown at 420) graphed in FIG. 16 can be associated with a starter control valve signature 310 such as that expressed, for example, in FIG. 15. Using, for example, a mathematical extrapolation algorithm, a continuous starter control valve deterioration trend function 410 responsive to the plurality of starter control valve health indices (shown at 420) can be constructed.

Figure 17:
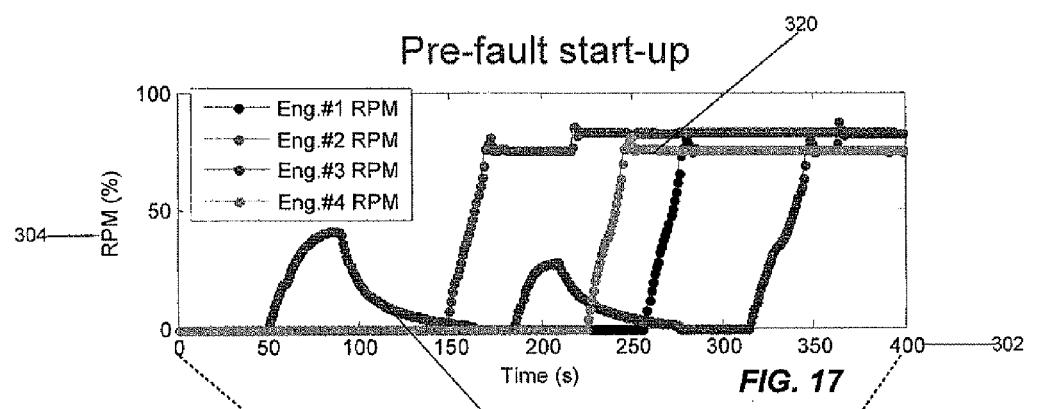
FIG. 17 is a two-dimensional line graph showing the starter control valve pre-failure signature of four gas turbine engines of a single aircraft during a pre-fault startup phase according to an embodiment of the present invention.

FIG. 17 also illustrates the connection between a starter control valve signature, a starter control valve health prognostic, a health index, and a continuous starter control valve deterioration trend function. FIG. 17, for example, is a two-dimensional line graph with time in the horizontal axis 302 and gas turbine engine RPM percentage reported by gas turbine engine RPM sensors, one for each gas turbine engine, in the vertical axis 304. More specifically, FIG. 17 shows the starter control valve pre-failure signature 320 of four gas turbine engines of a single aircraft during a pre-fault startup phase according to an embodiment of the present invention. In particular, FIG. 17 shows that the RPM percentage 325 of one gas turbine engine is considerably lower than the other three gas turbine engines which each exhibit normal fault-free startup patterns. Beneficially, although the startup fault typically occurs in only one of four gas turbine engines, as illustrated by FIG. 17, the systems, methods, and computer program products according to an embodiment of the present invention are able to construct a single starter control valve health prognostic for all four gas turbine engines that can easily be compared with operational data to predict the precise pre-failure point for a starter control valve of a gas turbine engine.

Figure 18:
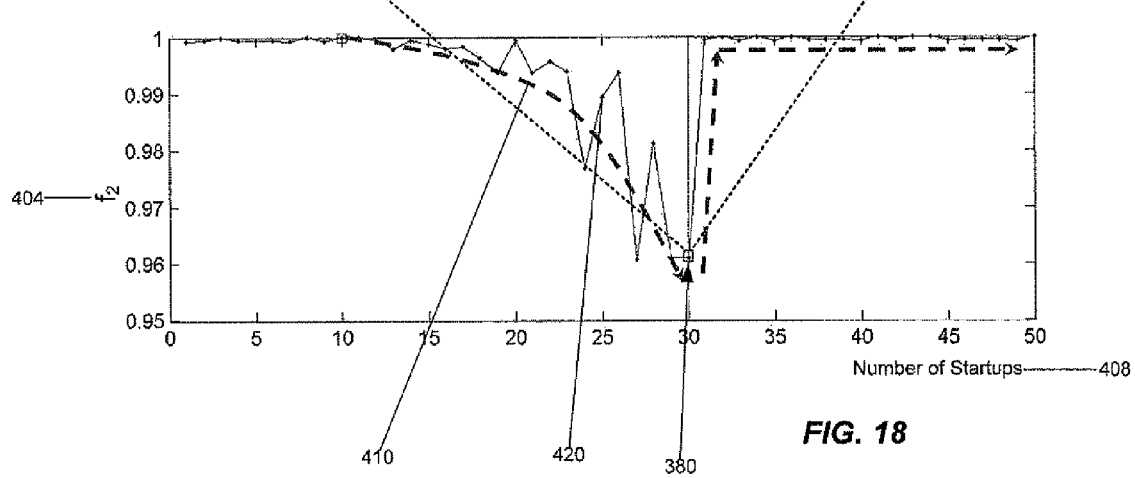
FIG. 18 is a two-dimensional line graph plotting both a plurality of health indices of the aircraft, one for each startup period, including the pre-fault startup phase shown in FIG. 17, and a continuous starter control valve deterioration trend function responsive to the plurality of health indices of the aircraft according to an embodiment of the present invention.

FIG. 18 is a two-dimensional line graph with the gas turbine engine startup number period associated with the one or more of the extracted health index feature in the horizontal axis 408 and the value of the entropy function of the time to reach post-light-off RPM of each of four gas turbine engines of a single aircraft in the vertical axis 404. FIG. 18, for example, plots both a plurality of health indices (shown at 420) of the aircraft, one for each startup phase period, and a continuous starter control valve deterioration trend function 410 responsive to the plurality of health indices (shown at 420) of the aircraft, where the plurality of health indices (shown at 420) of the aircraft and the continuous starter control valve deterioration trend function 410 are responsive to the entropy 404 of the time to reach post-light-off RPM of each of the four gas turbine engines according to an embodiment of the present invention.

The dotted lines (shown at 300) positioned between FIGS. 17 and 18 indicate how the starter control valve signature 320 for a single gas turbine engine startup period can be converted into a health index 380 and graphed alongside health indices (shown at 420) from a plurality of other gas turbine engine startup periods according to an embodiment of the present invention. Stated differently, each health index (shown at 420) graphed in FIG. 18 can be associated with a starter control valve signature 320 such as that expressed, for example, in FIG. 17. Using, for example, a mathematical extrapolation algorithm, a continuous starter control valve deterioration trend function 410 responsive to the plurality of starter control valve health indices (shown at 420) can be constructed. In this particular case, the starter control valve health index (shown at 380) maps to a starter control valve failure signature 320 which is a pre-fault startup starter control valve failure signature.

The continuous starter control valve deterioration trend function can, for example, facilitate an accurate prediction of a starter control valve failure during a future gas turbine engine startup period. For example, FIGS. 13, 14, 16, and 18 each indicate a potential predictive starter control valve failure point 380 at the point where the continuous starter control valve deterioration function 410 approaches zero as the gas turbine engine startup number period increases. Systems, computer implemented methods, and computer program products according to various embodiments of the present invention, can beneficially extract a starter control valve health prognostic prior to the starter control valve failure point in order to proactively predict the failure point of a starter control valve in a gas turbine engine far in advance of an actual point of failure.

Figure 19:
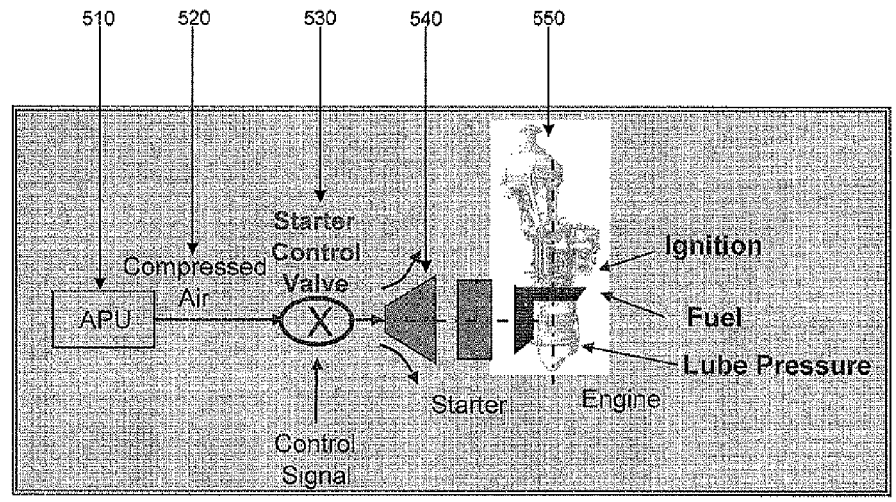
FIG. 19 is a diagram of the startup sequence for a gas turbine engine according to an embodiment of the present invention.
Figure 20:
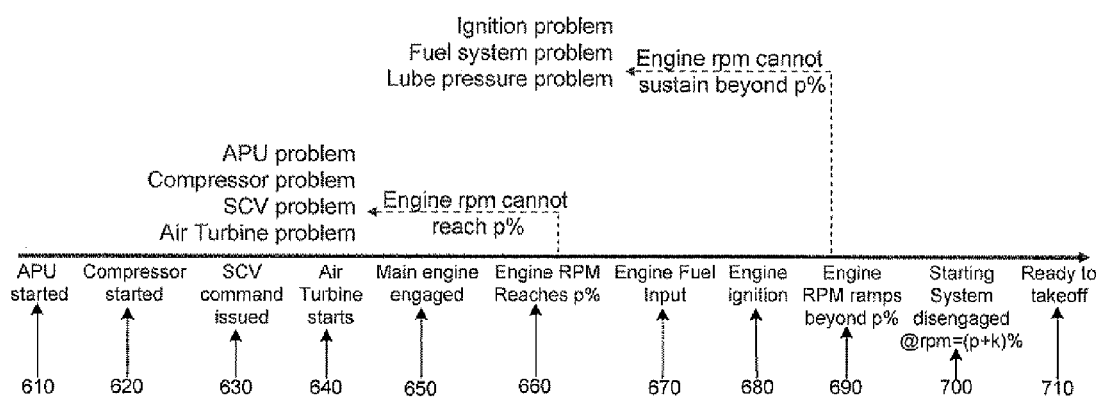
FIG. 20 is a timeline diagram of the startup sequence of a gas turbine engine including mechanical issues that may be encountered that can prevent a successful startup according to an embodiment of the present invention.

Specifically, FIG. 19 illustrates the startup sequence of one or more gas turbine engines associated with an aircraft according to an embodiment of the present invention, and FIG. 20 illustrates the startup sequence of one or more gas turbine engines associated with an aircraft, including problem issues that may be encountered that can prevent a successful startup according to an embodiment of the present invention. A gas turbine engine, according to an embodiment of the present invention, can be composed of several interrelated parts including, but not limited to, an APU 510 to drive compressed air 520 to a starter control valve 530 controlled by a control signal, a starter 540, and a gas turbine engine 550. The gas turbine engine can be generally operated in the following sequence: (1) the APU is started 610, (2) the compressor is started 620, (3) the control signal issues a command to open the starter control valve 630, (4) the air turbine starts 640, (5) the main engine is engaged 650, (6) the engine RPM reaches a certain percentage required to start the engine 660, (7) fuel is input into the engine 670, (8) the fuel ignites 680, (9) the engine RPM ramps beyond the initial RPM percentage needed to start the engine 690, (10) the starting system is disengaged 700, and (11) the aircraft is ready for takeoff 710. Aside from a starter control valve failure, other mechanical and pilot errors can, for example, cause the gas turbine engine startup process to fail. Various mechanical errors can include, but are not limited to, APU problems, compressor problems, starter control valve problems, air turbine problems, ignition problems, fuel system problems, and lube pressure problems. APU problems, compressor problems, starter control valve problems, and air turbine problems prevent the gas turbine engine from reaching the certain RPM percentage required to start the engine. Ignition problems, fuel system problems, and lube pressure problems prevent the engine from sustaining a RPM percentage beyond the certain RPM percentage required to start the engine.

It is important to note that while various embodiments of the present invention have been described in the context of a fully functional system, those skilled in the art will appreciate that the mechanism of at least portions of the present invention or aspects thereof are capable of being distributed in the form of a computer readable program product stored in a tangible computer medium and a computer readable medium of instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art. Examples of computer readable media include but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, HD-DVDs, mini disks, laser disks, Blu-ray disks, and other newer types of memories, and certain transmission type media such as digital and analog communication links capable of storing a computer readable program product according to various embodiments of the present invention.

Various embodiments of the present invention provide numerous benefits including, by way of example, the following: (1) they can proactively predict and trend starter control valve failures in gas turbine engines using a starter control valve health prognostic; (2) they can identify a remote projected point of failure for a starter control valve by constructing a continuous starter control valve deterioration trend function responsive to current operational data that can be tracked as the failure approaches; (3) they can reduce operational costs for aircraft operators due to better allocation of aircraft to critical missions, reduced aircraft cancellations, reduced aircraft downtime, and reduced safety-related accidents; (4) they can increase aircraft safety; and (5) they can reduce false positive indications of a starter control valve failure by applying data specific to the gas turbine engine model. Beneficially, various embodiments of the present invention can predict a starter control valve failure by identifying a potential predictive starter control valve failure point or by constructing a continuous starter control valve deterioration trend function responsive to a plurality of starter control valve health indices to identify a precise failure point far in advance of an actual event of failure. Because various embodiments of the present invention can be used in real time data analysis to locate a potential predictive starter control valve failure point as it occurs or to identify a precise failure point far in advance of an actual event of failure, the present invention can be immediately and beneficially applied to legacy vehicles or legacy gas turbine engines on the verge of experiencing a starter control valve failure. Beneficially, the present invention is not limited in applicability to new vehicles, or legacy gas turbine engines with new starter control valves.

Specifically in cases where systems, methods, and computer program products according to various embodiments of the present invention are applied to aircraft, various embodiments of the present invention beneficially reduce operational costs for aircraft operators due to better allocation of aircraft to critical missions, reduced aircraft cancellations, reduced aircraft downtime, reduced mission cancellations, and reduced safety-related accidents. More specifically, the ability of various embodiments of the present invention to proactively predict starter control valve failures can be directly related to minimizing operational costs for the consumer of the aircraft and therefore, this capability provides added desirability and competitive advantage to aircrafts monitored with systems, methods, and computer program products according to various embodiments of the present invention. Additionally, various embodiments of the present invention allow aircraft operators to make intelligent and proactive decisions for supply-chain management, spare inventory management, aircraft maintenance, and other operational issues thereby reducing aircraft operational costs. For example, an embodiment of the present invention can provide aircraft operators with tools to make predictive operational decisions associated with starter control valves by matching the deterioration of a starter control valve to mission requirements when allocating multiple aircraft across multiple missions. Accordingly, such an embodiment of the present invention can reduce reactive practices and processes on supply-chain and aircraft part inventory management thereby reducing operational costs, aircraft unavailability, and aircraft downtime.

Additionally, various embodiments of the present invention can reduce or minimize false positive indications of a starter control valve failure by applying data specific to the gas turbine engine model. For example, various embodiments of the present invention can determine a potential predictive starter control valve failure point where one of the one or more health indices correlates to the starter control valve health prognostic for the gas turbine engine model. However, there can be scenarios where various embodiments of the present invention determine a potential predictive starter control valve failure point that is merely a false indication of a potential starter control valve failure. For example, according to the present invention, false positive indications of a potential predictive starter control valve failure point can be reduced in instances where knowledge of the vehicle or the gas turbine engine in particular indicates that the appearance of the starter control valve pre-failure signature is due to a cause other than a starter control valve failure, including, but not limited to, pilot error, malfunction of a gas turbine engine auxiliary power unit, malfunction of a gas turbine engine compressor, malfunction of a gas turbine engine turbine, a fuel system problem, an ignition problem, or a lube pressure problem. For example, the one or more health indices may indicate pilot error rather than a failing starter control valve.

Additionally, a potential starter control valve pre-failure signature determined according to various embodiments of the present invention can also yield a false positive indication of a starter control valve failure in instances where outlier data is used to calculate the starter control valve health prognostic. Gas turbine engine startup data may not, for example, have been correctly filtered during the download process to reduce outlier data thereby resulting in the inaccurate determination of a potential predictive starter control valve failure point. By applying data specific to the gas turbine engine model to determine if the potential predictive starter control valve failure point is a false positive indication of a starter control valve failure, various embodiments of the present invention beneficially reduce or minimize false positive indications of a starter control valve failure.

In the drawings and specification, there have been disclosed a typical preferred embodiment of the invention, and although specific terms are employed, the terms are used in a descriptive sense only and not for purposes of limitation. Various embodiments of the invention have been described in considerable detail with specific reference to these various illustrated embodiments. It will be apparent, however, that various modifications and changes can be made within the spirit and scope of the invention as described in the foregoing specification and as defined in the appended claims.

That claimed is:

1. A computer implemented method to predict starter control valve failures in gas turbine engines using a starter control valve health prognostic comprising the steps of:

receiving historic gas turbine engine startup data for a plurality of gas turbine engine startups of one or more historic gas turbine engines of a certain gas turbine engine model, the historic gas turbine engine startup data including an indication that at least one of the plurality of gas turbine engine startups failed due to a starter control valve failure;

determining, in a first computer process by a computer, a starter control valve pre-failure signature for the one or more historic gas turbine engines responsive to the historic gas turbine engine startup data;

extracting, in a second computer process by the computer, one or more health index features from the starter control valve pre-failure signature of the one or more historic gas turbine engines;

constructing, in a third computer process by the computer, a starter control valve health prognostic for the certain gas turbine engine model responsive to the one or more health index features extracted from the starter control valve pre-failure signature of the one or more historic gas turbine engines;

receiving operational gas turbine engine startup data for at least one gas turbine engine startup of one or more operational gas turbine engines of the certain gas turbine engine model;

extracting, in a fourth computer process by the computer, one or more health index features from the operational gas turbine engine startup data for each of the at least one gas turbine engine startups;

calculating, in a fifth computer process by the computer, a starter control valve health index for each of the at least one gas turbine engine startups responsive to the one or more health index features extracted from the operational gas turbine engine startup data to thereby define one or more health indices;

comparing, in a sixth computer process by the computer, each of the one or more health indices calculated by the fifth computer process to the starter control valve health prognostic for the certain gas turbine engine model; and determining in a seventh computer process by the computer, responsive to the step of comparing, a potential predictive starter control valve failure point, the potential predictive starter control valve failure point being located where one of the one or more health indices correlates to the starter control valve health prognostic for the certain gas turbine engine model.

2. A computer implemented method as defined in claim 1, wherein the operational gas turbine engine startup data received from the one or more operational gas turbine engines of the certain gas turbine engine model for the at least one gas turbine engine startup is for a plurality of gas turbine engine startups;
wherein the one or more operational gas turbine engines are a plurality of operational gas turbine engines; and
wherein the computer implemented method further comprises the steps of:
constructing a continuous starter control valve deterioration trend function responsive to a plurality of starter control valve health indices calculated for each of the plurality of gas turbine engine startups responsive to the one or more health index features extracted from the operational gas turbine engine startup data,
determining, using the continuous starter control valve deterioration trend function, a point on the continuous starter control valve deterioration trend function that correlates to the starter control valve health prognostic for the certain gas turbine engine model to thereby identify the potential predictive starter control valve failure point, and
identifying, in an eighth computer process by the computer, one of the one or more operational gas turbine engines that is associated with the potential predictive starter control valve failure point determined by the seventh computer process.

3. A computer implemented method as defined in claim 1, further comprising the steps of:
identifying one or more sensors of the certain gas turbine engine model usable to predict failure of a starter control valve of a gas turbine engine of the certain gas turbine engine model prior to an actual event of failure;
parsing the historic gas turbine engine data and the operational gas turbine engine data to select data from the identified one or more sensors usable to predict failure of a starter control valve of a gas turbine engine of the certain gas turbine engine model prior to an event of failure;
segmenting the historic gas turbine engine data and the operational gas turbine engine data to thereby select only gas turbine engine startup data; and
analyzing the historic gas turbine engine startup data and the operational gas turbine engine startup data to reduce irregular gas turbine engine operations and data outliers.

4. A computer implemented method as defined in claim 3, wherein the historic gas turbine engine startup data is associated with a first vehicle;
wherein the operational gas turbine engine startup data is associated with a second vehicle;
wherein the one or more sensors are legacy sensors;
wherein the identified one or more legacy sensors includes one or more of an auxiliary power unit sensor, a plurality of engine start switch sensors, each start switch sensor recording the start switch state for the engine associated with the start switch, and a plurality of gas turbine engine RPM sensors;
wherein the one or more health index features include one or more of: the total gas turbine engine RPM rise time and one-half of the total gas turbine engine RPM rise time; and
wherein the computer implemented further includes the step of decoding the historic gas turbine engine data and the operational gas turbine engine data from a binary trend file to an ASCII trend file.

5. A computer implemented method as defined in claim 4, wherein the computer implemented method further comprises the steps of:
analyzing operational gas turbine engine RPM sensor data received for the at least one gas turbine engine startup of the one or more operational gas turbine engines of the certain gas turbine engine model;
determining, responsive to analyzing operational gas turbine engine RPM sensor data, the existence of one or more mechanical problems associated with one or more of an auxiliary power unit, a compressor, an air turbine, an ignition system, a fuel system, or a lube pressure system of the aircraft at the potential predictive starter control valve failure point;
determining, responsive to analyzing operational gas turbine engine RPM sensor data, the existence of pilot initiated purging of a fuel injection system of each of the one or more operational gas turbine engines at the potential predictive starter control valve failure point; and
reducing false positive indications of a starter control valve failure responsive determining the existence of one or more mechanical problems and determining the existence of pilot initiated purging of the fuel injection system of each of the one or more operational gas turbine engines at the potential predictive starter control valve failure point.

6. A computer implemented method as defined in claim 5, wherein the continuous starter control valve deterioration trend function is a function of two variables, a first variable representing one or more of the one or more extracted health index features and a second variable representing the gas turbine engine startup number associated with the one or more of the one or more extracted health index features; and
wherein a mathematical limit of the continuous starter control valve deterioration trend function approaches zero as the gas turbine engine startup number associated with the one or more of the one or more extracted health index features increases.

7. A computer implemented method as defined in claim 5, wherein the first computer process, the second computer process, and the third computer process are performed by a first computer;
wherein the fourth computer process, the fifth computer process, the sixth computer process, and the seventh computer process are performed by a second computer;
wherein the first vehicle is an aircraft;
wherein the second vehicle is an aircraft; and
wherein the computer implemented method further comprises the steps of:
storing the historic gas turbine engine startup data in a first database associated with the first computer,
storing the one or more health index features in a second database associated with the first computer,
storing the starter control valve health prognostic for the certain gas turbine engine model in a third database associated with the first computer,
storing the operational gas turbine engine startup data in a fourth database associated with the second computer, and
storing the one or more starter control valve health indices in a fourth database associated with the second computer.

8. A starter control valve failure prediction machine to predict and trend starter control valve failures in gas turbine engines using a starter control valve health prognostic, the failure prediction machine comprising:
- a first computer readable storage medium storing historic gas turbine engine startup data for a plurality of gas turbine engine startups of one or more historic gas turbine engines of a certain gas turbine engine model, the historic gas turbine engine startup data including an indication that at least one of the plurality of gas turbine engine startups failed due to a starter control valve failure;
- a second computer readable storage medium storing operational gas turbine engine startup data for at least one gas turbine engine startup of one or more operational gas turbine engines of the certain gas turbine engine model;
- a computer adapted to be in communication with the first computer readable storage medium and the second computer readable storage medium and having a processor, a memory, and a computer readable program product stored in the memory of the computer, the computer readable program product including:
  - a starter control valve pre-failure signature determiner configured to determine at least one starter control valve pre-failure signature for the one or more historic gas turbine engines responsive to the historic gas turbine engine startup data received from the first computer readable storage medium,
  - a health prognostic constructor configured to construct a starter control valve health prognostic for the certain gas turbine engine model responsive to one or more health index features extracted from the at least one starter control valve pre-failure signature of the one or more historic gas turbine engines,
  - a health index determiner configured to determine a starter control valve health index for each of the at least one gas turbine engine startups of the one or more operational gas turbine engines responsive to one or more health index features extracted from the operational gas turbine engine startup data received from the second computer readable storage medium to thereby define one or more health indices, and
  - a signature comparator configured to compare each of the one or more health indices with the starter control valve health prognostic for the certain gas turbine engine model to thereby identify a potential predictive starter control valve failure point, the potential predictive starter control valve failure point being located where one of the one or more health indices correlates to the starter control valve health prognostic for the certain gas turbine engine model.

9. A starter control valve failure prediction machine as defined in claim 8,
- wherein the operational gas turbine engine startup data for the at least one gas turbine engine startup is for a plurality of gas turbine engine startups;
- wherein the one or more operational gas turbine engines are a plurality of operational gas turbine engines;
- wherein the starter control valve failure prediction machine further comprises a gas turbine engine identifier configured to identify one of the one or more operational gas turbine engines associated with the potential predictive starter control valve failure point; and
- wherein the signature comparator is further configured to:
  - construct a continuous starter control valve deterioration trend function responsive to a plurality of starter control valve health indices calculated for each of the plurality of gas turbine engine startups and responsive to the one or more health index features extracted from the operational gas turbine engine startup data, and
  - determine, using the continuous starter control valve deterioration trend function, a point on the continuous starter control valve deterioration trend function that correlates to the starter control valve health prognostic for the certain gas turbine engine model to thereby identify the potential predictive starter control valve failure point.

10. A starter control valve failure prediction machine as defined in claim 8,
- wherein the historic gas turbine engine startup data is associated with a first vehicle;
- wherein the operational gas turbine engine startup data is associated with a second vehicle; and
- wherein the starter control valve failure prediction machine further includes an error minimizer configured to minimize false positive indications of a starter control valve failure to thereby verify the potential predictive starter control valve failure point by determining the existence of one or more mechanical problems associated with one or more of an auxiliary power unit, a compressor, an air turbine, an ignition system, a fuel system, or a tube pressure system of the second vehicle at the potential predictive starter control valve failure point, and determining the existence of pilot initiated purging of a fuel injection system of the identified gas turbine engine of the second vehicle at the potential predictive starter control valve failure point.

11. A starter control valve failure prediction machine as defined in claim 10,
- wherein the first vehicle and the second vehicle are the same vehicle;
- wherein the one or more health index features include one or more of: the total gas turbine engine RPM rise time and one-half of the total gas turbine engine RPM rise time; and
- wherein the first computer readable storage medium and the second computer readable storage medium are both stored together on a third computer readable storage medium and the third computer readable storage medium is associated with the computer.

12. A starter control valve failure prediction machine as defined in claim 10,
- wherein the computer further comprises a graphical user interface device and a user interface input device;
- wherein the signature comparator is further configured to display via the graphical user interface of the computer the continuous starter control valve deterioration trend function and to receive from a user input via the user interface input device of the computer identifying a potential predictive starter control valve failure point of the second vehicle where a point of the starter control valve deterioration trend function correlates to the starter control valve health prognostic for the certain gas turbine engine model; and
- wherein the error minimizer is further configured to display via the graphical user interface device of the computer the potential predictive starter control valve failure point and to receive input via the user interface input device of the computer from the user indicating whether the potential predictive starter control valve failure point is a false positive indication of a starter control valve failure.

13. A starter control valve failure prediction machine as defined in claim 12,
   wherein the continuous starter control valve deterioration trend function is a function of two variables, a first variable representing one or more of the one or more extracted health index features and the second variable representing the gas turbine engine startup number associated with the one or more of the one or more extracted health index features; and
   wherein a mathematical limit of the continuous starter control valve deterioration trend function approaches zero as the gas turbine engine startup number associated with the one or more of the one or more extracted health index features increases.

14. A starter control valve failure prediction machine as defined in claim 12,
   wherein the starter control valve allure prediction machine further comprises an historic data downloader configured to:
      download the historic gas turbine engine startup data from the first computer readable storage medium
      parse the historic gas turbine engine data to thereby select data usable to predict failure of a starter control valve of a gas turbine engine of the certain gas turbine engine model prior to an event of failure,
      segment the historic gas turbine engine data to certain only gas turbine engine startup data, and
      analyze the historic gas turbine engine startup data to reduce irregular gas turbine engine operations and data outliers; and
   wherein the starter control valve failure prediction machine further comprises an operational data downloader configured to:
      download the operational gas turbine engine startup data from the second computer readable storage medium;
      parse the operational gas turbine engine data to thereby select data usable to predict failure of a starter control valve of a gas turbine engine of the certain gas turbine engine model prior to an event of failure,
      segment the operational gas turbine engine data to certain only gas turbine engine startup data, and
      analyze the operational gas turbine engine startup data to reduce irregular gas turbine engine operations and data outliers.

15. A computer readable program product stored in a tangible computer medium and including instructions that when executed by a computer cause the computer to perform the operations of:
   determining a starter control valve pre-failure signature for one or more gas turbine engines of a certain gas turbine engine model responsive to historic gas turbine engine startup data received for a plurality of gas turbine engine startups of one or more gas turbine engines of the certain gas turbine engine model, the historic gas turbine engine startup data including an indication that at least one of the plurality of gas turbine engine startups failed due to a starter control valve failure;
   constructing a starter control valve health prognostic for the certain gas turbine engine model responsive to one or more health index features extracted from the starter control valve pre-failure signature of the one or more gas turbine engines;
   calculating a starter control valve health index for each of a plurality of operational gas turbine engine startups of a plurality of gas turbine engines operationally mounted on a vehicle and of the certain gas turbine engine model responsive to health index features extracted from operational gas turbine engine startup data to thereby define one or more health indices;
   comparing each of the one or more health indices to the starter control valve health prognostic for the certain gas turbine engine model;
   determining, responsive to the step of comparing, a potential predictive starter control valve failure point, the potential predictive starter control valve failure point being located where one of the one or more health indices correlates to the starter control valve health prognostic for the certain gas turbine engine model; and
   identifying the gas turbine engine of the vehicle associated with the potential predictive starter control valve failure point.

16. A computer readable program product as defined in claim 15:
   wherein the operational gas turbine engine startup data includes gas turbine engine RPM sensor data; and
   wherein the computer readable program product further comprising instructions that when executed by the computer cause the computer to perform the operations of:
      analyzing the operational gas turbine engine RPM sensor data;
      determining, responsive to analyzing operational gas turbine engine RPM sensor data, the existence of one or more mechanical problems associated with one or more of an auxiliary power unit, a compressor, an air turbine, a ignition system, a fuel system, or a lube pressure system of the vehicle at the potential predictive starter control valve failure point;
      determining, responsive to analyzing operational gas turbine engine RPM sensor data, the existence of pilot initiated purging of a fuel injection system of the identified gas turbine engine of the vehicle at the potential predictive starter control valve failure point;
      displaying via a graphical user interface device associated with the computer the potential predictive starter control valve failure point, and responsive to the step of determining, the existence of one or more mechanical problems and the existence of pilot initiated purging;
      receiving input from a user via a user interface input device associated with the computer indicating whether the potential predictive starter control valve failure point is a false positive indication of a starter control valve failure; and
      minimizing false positive indications of a starter control valve failure to thereby verify the potential predictive starter control valve failure point responsive to receiving input from the user via the user interface input device associated with the computer indicating whether the potential predictive starter control valve failure point is a false positive indication of a starter control valve failure.

17. A computer readable program product as defined in claim 15, wherein the computer readable program product further comprises instructions that when executed by the computer cause the computer to perform the operations of:
   constructing a continuous starter control valve deterioration trend function responsive to a plurality of starter control valve health indices calculated for each of the plurality of operational gas turbine engine startups and responsive to the one or more health index features extracted from the operational gas turbine engine startup data;

displaying via a graphical user interface of the computer the continuous starter control valve deterioration trend function;

receiving input from a user via a user interface input device of the computer identifying a potential predictive starter control valve failure point where a point on the starter control valve deterioration trend function correlates to the starter control valve health prognostic for the certain gas turbine engine model; and identifying, responsive to receiving input from the user, the potential predictive starter control valve failure point.

18. A computer readable program product as defined in claim 15, wherein the continuous starter control valve deterioration trend function is a function of two variables, a first variable representing one or more of the one or more extracted health index features and a second variable representing the gas turbine engine startup number associated with the one or more of the one or more extracted health index features;

wherein a mathematical limit of the continuous starter control valve deterioration trend function approaches zero as the gas turbine engine startup number associated with the one or more of the one or more extracted health index features increases; and wherein the starter control valve health prognostic is a single value.

19. A computer readable program product as defined in claim 15, wherein the starter control valve health prognostic includes a plurality of values to thereby create a starter control valve health prognostic threshold; and wherein the computer readable program product further comprises instructions that when executed by the computer cause the computer to perform the operation of determining whether each of the one or more health indices correlates to at least one of the plurality of values of the health prognostic threshold to thereby identify the potential predictive starter control valve failure point of the vehicle where one of the one or more health indices correlates to at least one of the plurality of values of the starter control valve health prognostic for the certain gas turbine engine model.

20. A computer readable program product as defined in claim 15, wherein the starter control valve health prognostic is a rate of declination; and wherein the computer readable program product further comprises instructions that when executed by the computer cause the computer to perform the operations of:

determining a health index rate of declination for the one or more starter control valve health indices, and determining whether the health index rate of declination is greater or equal to the starter control valve health prognostic to thereby identify a potential predictive starter control valve failure point of the vehicle where the health index rate of declination is greater or equal to the starter control valve health prognostic.

* * * * *